(12) United States Patent
Orihara et al.

(10) Patent No.: US 10,505,257 B2
(45) Date of Patent: Dec. 10, 2019

(54) ANTENNA DEVICE AND ELECTRONIC APPARATUS

(71) Applicant: DEXERIALS CORPORATION, Tokyo (JP)

(72) Inventors: Katsuhisa Orihara, Tochigi (JP); Norio Saito, Tochigi (JP); Akihiro Fukuda, Tochigi (JP); Manabu Suzuki, Tochigi (JP); Hiroyuki Ryoson, Tochigi (JP); Masayoshi Kanno, Tochigi (JP); Masahiro Kobo, Tochigi (JP)

(73) Assignee: DEXERIALS CORPORATION, Tokyo (JP)

( * ) Notice: Subject to any disclaimer, the term of this patent is extended or adjusted under 35 U.S.C. 154(b) by 169 days.

(21) Appl. No.: 15/111,565

(22) PCT Filed: Jan. 14, 2015

(86) PCT No.: PCT/JP2015/050742
§ 371 (c)(1),
(2) Date: Jul. 14, 2016

(87) PCT Pub. No.: WO2015/108054
PCT Pub. Date: Jul. 23, 2015

(65) Prior Publication Data
US 2016/0336645 A1    Nov. 17, 2016

(30) Foreign Application Priority Data

Jan. 17, 2014  (JP) ................. 2014-006594
Jan. 17, 2014  (JP) ................. 2014-006595
Jan. 17, 2014  (JP) ................. 2014-006596

(51) Int. Cl.
*H01Q 7/00* (2006.01)
*H01Q 1/24* (2006.01)
(Continued)

(52) U.S. Cl.
CPC ............ *H01Q 1/243* (2013.01); *G06K 19/077* (2013.01); *H01Q 1/2208* (2013.01); *H01Q 7/00* (2013.01); *H04B 5/0031* (2013.01)

(58) Field of Classification Search
CPC ........ H01Q 1/243; H01Q 1/2208; H01Q 7/00; G06K 19/077; H04B 5/0031
See application file for complete search history.

(56) References Cited

U.S. PATENT DOCUMENTS

2006/0028384 A1*  2/2006  Akiho ................. G06K 7/0008
                                                    343/742
2009/0201116 A1*  8/2009  Orihara ............ G06K 19/07749
                                                    336/200
(Continued)

FOREIGN PATENT DOCUMENTS

JP    2007-325054 A    12/2007
JP    4883125 B2        2/2012
(Continued)

OTHER PUBLICATIONS

Mar. 24, 2015 Search Report issued in International Patent Application No. PCT/JP2015/050742.

*Primary Examiner* — Daniel Munoz
*Assistant Examiner* — Bamidele A Jegede
(74) *Attorney, Agent, or Firm* — Oliff PLC

(57) ABSTRACT

An antenna device incorporated in an electronic apparatus to communicate with an external apparatus via an electromagnetic field signal includes a first conductor provided inside a housing of the electronic apparatus and opposing the external apparatus, a loop antenna having an antenna coil conductively coupled to the external apparatus and coiling thereon, a sheet-like second conductor provided as being spaced with a predetermined space from the first conductor and partially overlapping or making contact with a surface of the loop antenna opposite to a surface opposing the
(Continued)

external apparatus, and a sheet-like third conductor provided between the first conductor and the second conductor and having one end overlapping or making contact with the first conductor and other end partially overlapping or making contact with the second conductor.

16 Claims, 27 Drawing Sheets

(51) Int. Cl.
*G06K 19/077* (2006.01)
*H01Q 1/22* (2006.01)
*H04B 5/00* (2006.01)

(56) References Cited

U.S. PATENT DOCUMENTS

| | | | | |
|---|---|---|---|---|
| 2010/0321267 A1* | 12/2010 | Ito | ............................ | H01Q 7/08 343/788 |
| 2012/0038443 A1* | 2/2012 | Kubo | ................. | G06K 7/10336 336/90 |
| 2012/0162028 A1* | 6/2012 | Kubo | ................. | H01M 2/1066 343/702 |
| 2012/0176282 A1* | 7/2012 | Kato | ................ | G06K 19/07749 343/702 |
| 2012/0176283 A1* | 7/2012 | Yosui | ............... | G06K 19/07779 343/702 |
| 2012/0200167 A1* | 8/2012 | Orihara | .............. | G06K 19/0773 307/104 |
| 2012/0204414 A1* | 8/2012 | Orihara | ............ | G06K 19/07749 29/593 |
| 2012/0208606 A1* | 8/2012 | Kubo | ............... | G06K 19/07779 455/575.7 |
| 2012/0227248 A1* | 9/2012 | Orihara | ............ | G06K 19/07749 29/593 |
| 2013/0012127 A1* | 1/2013 | Orihara | .................. | H01Q 1/243 455/41.1 |
| 2014/0049436 A1* | 2/2014 | Kubo | ................. | G06K 7/10336 343/788 |
| 2014/0176382 A1* | 6/2014 | Nakano | .................. | H01Q 1/243 343/788 |
| 2014/0191916 A1* | 7/2014 | Ito | ............................ | H01Q 7/06 343/788 |
| 2014/0198006 A1* | 7/2014 | Nakano | ............ | G06K 19/07794 343/788 |
| 2014/0320354 A1* | 10/2014 | Sugita | .............. | G06K 19/07749 343/702 |

FOREIGN PATENT DOCUMENTS

| | | |
|---|---|---|
| JP | 4894945 B2 | 3/2012 |
| JP | 2012-147407 A | 8/2012 |
| JP | 5135450 B2 | 2/2013 |
| JP | 2013-115647 A | 6/2013 |

* cited by examiner

ANTENNA DEVICE AND ELECTRONIC APPARATUS

BACKGROUND OF THE INVENTION

Field of the Invention

The present invention relates to an antenna device incorporated in an electronic apparatus to communicate with an external apparatus via an electromagnetic field signal and to the electronic apparatus having the antenna device incorporated therein. The present application claims priority based on Japanese Patent Application Nos. 2014-006594, 2014-006595 and 2014-006596 filed in Japan on Jan. 17, 2014.

Description of Related Art

Conventionally, in electronic apparatuses such as portable telephones, smartphones, and tablet PCs, an antenna module for RFID (Radio Frequency Identification) has been used to mount a function of NFC (Near Field Communication). This antenna module communicates with an antenna coil mounted on a transmitter such as a reader/writer or the like by using inductive coupling. That is, in this antenna device, a magnetic field from the reader/writer is received by an antenna coil and thereby converted into electric power, which can drive an IC which functions as a communication processing unit.

To reliably perform communication, the antenna module is required to receive, at the antenna coil, magnetic fluxes equal to or larger than a certain value from the reader/writer. For this reason, in an antenna device according to a conventional example, a loop coil is provided in a housing of a portable telephone, and this coil receives magnetic fluxes from the reader/writer. In the antenna module incorporated in an electronic apparatus such as a portable telephone, magnetic fluxes from the reader/writer are caused to bounce back by eddy current occurring because the metal of a board, battery pack, or the like inside the apparatus receives a magnetic field from the reader/writer. For example, on a housing surface of the portable telephone for consideration, the magnetic field coming from the reader/writer tends to be strong at an outer circumferential portion of the housing surface and weak at a portion near the center of the housing surface.

For an antenna using a normal loop coil, the loop coil has an opening which is positioned at a center portion of the portable telephone where a magnetic field passing through the above-described outer circumferential portion of the housing surface is not much received. Thus, in the antenna using the normal loop coil, efficiency of receiving magnetic field is poor. Hence, an antenna device in which the loop antenna is disposed on the outer circumferential portion of the housing surface where a magnetic field coming from the reader/writer is strong and an antenna device in which a magnetic sheet is used to increase magnetic fluxes to enhance performance have been suggested. In these antenna devices, the antenna has a rectangular shape and is installed with its long side along an outer circumferential edge of the housing surface (for example, refer to Patent Literatures 1 to 3).

Patent Literature 1: JP 4883125 B
Patent Literature 2: JP 4894945 B
Patent Literature 3: JP 5135450 B

SUMMARY OF THE INVENTION

As described above, in the RFID antenna module having a portable terminal device incorporated therein, a method of enhancing characteristic by using a magnetic field shielding effect by a metal plate such as a board has been suggested. As an antenna device with efficiency enhanced by using a magnetic field shielding effect by metal, the applicant has suggested, for example, in Japanese Patent Application No. 2013-021616 an antenna device including a first metal plate provided inside a housing of an electronic apparatus and opposing an external apparatus, an antenna coil provided inside the housing of the electronic apparatus and inductively coupled to the external apparatus, and a sheet-like second conductor provided inside the housing of the electronic apparatus, overlapping or making contact with a first conductor as a main metal plate and at least partially overlapping a surface of the antenna coil opposite to a surface opposing the external apparatus.

However, a positional relation between the first conductor as a main metal plate of the electronic apparatus including the antenna device and the antenna device varies depending on the structure of the electronic apparatus. Accordingly, with a distance from the first conductor, the size of the second conductor to be laminated to the antenna device is widely varied, thereby making standardization of antenna module including a second conductor difficult. Also, when a distance between the first conductor and the antenna device is far, the size of the second conductor included in the antenna device is increased, which restricts design flexibility of the electronic apparatus when the antenna module is installed and makes its handling difficult.

Also, in the NFC antenna module with its communication characteristic enhanced by the magnetic shielding effect by the main metal plate of the electronic apparatus including the antenna device, to sufficiently exert its performance, what is important is that the implementation position is near the outer edge part of the metal plate. However, electronic apparatuses such as portable terminals are becoming small in size and multifunctional and, accordingly, various electronic components such as a camera have been highly densely mounted inside the electronic apparatuses. Thus, a problem arises that the performance of the NFC communication characteristic enhanced by the magnetic shielding effect by the metal plate is not sufficiently exerted. Also, as the electronic apparatuses such as portable terminals are becoming multifunctional, various electronic components such as a camera have been mounted inside the electronic apparatus, and, accordingly, due to the internal structure of the electronic apparatus, the NFC antenna module may not be able to be implemented near the outer edge part of the metal plate. In this case, a problem arises that necessary performance of the communication characteristic enhanced by the magnetic shielding effect by the metal plate and so forth is not sufficiently exerted.

The present invention has been made in view of the above problems, and has an object of providing a novel and improved antenna device and electronic apparatus capable of improving a stable communication function of an antenna device including a second conductor and to achieve standardization and ensure design flexibility of an antenna module including the second conductor, regardless of the internal structure of an electronic apparatus.

Also, the present invention has been made in view of the above problems, and has an object of providing a novel and improved antenna device and electronic apparatus capable of more reliably enhancing an NFC communication characteristic by using a magnetic shielding effect by a main metal plate of the electronic apparatus which is becoming small in size and multifunctional.

Furthermore, the present invention has been made in view of the above problems, and has an object of providing a novel and improved antenna device and electronic apparatus capable of enhancing an NFC communication characteristic by using a magnetic shielding effect of a main metal plate of the electronic apparatus, irrespectively of the implementation position of an antenna module.

One mode of the present invention is directed to an antenna device incorporated in an electronic apparatus to communicate with an external apparatus via an electromagnetic field signal, the device including a first conductor provided inside a housing of the electronic apparatus and opposing the external apparatus, a loop antenna provided inside the housing of the electronic apparatus and having an antenna coil conductively coupled to the external apparatus and coiling thereon, a sheet-like second conductor provided as being spaced with a predetermined space from the first conductor and partially overlapping or making contact with a surface of the loop antenna opposite to a surface opposing the external apparatus, and a sheet-like third conductor provided between the first conductor and the second conductor and having one end overlapping or making contact with the first conductor and other end partially overlapping or making contact with the second conductor. According to the one mode of the present invention, while improving a stable communication function of the antenna device, it is possible to facilitate standardization of an antenna module including the second conductor and also ensure design flexibility of the antenna module.

Here, in one mode of the present invention, the loop antenna may be divided into two as one side part and other side part via a center line in a longitudinal direction, and the second conductor may overlap the one side part where a lead wire of the antenna coil of the loop antenna coils in one direction, and may not overlap the other side part where the lead wire of the antenna coil coils in another direction. In this manner, with the second conductor and the loop antenna partially overlapping, magnetic fluxes are concentrated on a non-overlapping region, and efficient power generation in that region can be promoted.

Also, in one mode of the present invention, the second conductor may overlap over a full length of the one side part of the loop antenna. With this, the second conductor inhibits inductive coupling in the one side part of the loop antenna via the third conductor, relatively decreases the amount of current in an opposite direction to a current occurring in the other side part, and also induces the magnetic fluxes from the one side part to the other side part of the loop antenna to promote coupling in the other side part, thereby allowing an improvement in communication characteristic.

Also, in one mode of the present invention, the second conductor may have a size in the longitudinal direction substantially equal to a size of the loop antenna in the longitudinal direction. With this, the size of the second conductor can be minimized as required to improve the communication characteristic of the antenna device. Therefore, it is possible to achieve standardization and improvement in design flexibility of the antenna module including the second conductor.

Also, in one mode of the present invention, the other side part of the loop antenna may be disposed via the second conductor at a position opposing the third conductor. With this, with the second conductor partially overlapping the loop antenna, the magnetic field in an overlapping region is caused to bounce back via the third conductor to inhibit inductive coupling in the overlapping region, and a current occurring in a non-overlapping region can be efficiently transmitted.

Also, in one mode of the present invention, the third conductor may have a hole part formed therein, the third conductor may be plurally divided or may be configured so as to overlap or make contact with a side surface part of the first conductor. Furthermore, the third conductor may be configured so as to overlap or make contact with one surface of the first conductor opposing the external apparatus or part of a surface opposite to the one surface. In this manner, by providing the third conductor, design flexibility of the antenna module including the second conductor is improved.

Also, another mode of the present invention is directed to an electronic apparatus having any of the antenna devices described above incorporated therein, the electronic apparatus being communicable with an external apparatus via an electromagnetic field signal. According to this other mode of the present invention, while achieving standardization and improvement in design flexibility of the antenna module including the second conductor, it is possible to enhance the communication characteristic of the electronic apparatus with respect to the external apparatus.

Also, another mode of the present invention is directed to an antenna device incorporated in an electronic apparatus to communicate with an external apparatus via an electromagnetic field signal, the device including a first conductor provided inside a housing of the electronic apparatus and opposing the external apparatus, a loop antenna provided to a portion near an outer edge part of the first conductor and having an antenna coil conductively coupled to the external apparatus and coiling thereon, and a magnetic sheet formed of a magnetic material and provided as developing from a center part of the loop antenna toward an opposing end of the outer edge part opposing the loop antenna. According to this other mode of the present invention, with the first conductor being shielded with the magnetic sheet provided so as to develop from a portion near the outer edge part where the loop antenna is provided, the magnetic fluxes from the external apparatus can be collected and induced to the center part of the loop antenna. Thus, by using the magnetic shielding effect by the main metal plate of the electronic apparatus, its NFC communication characteristics can be enhanced.

Here, in another mode of the present invention, the first conductor may be a metal cover which covers the housing. In this manner, when the first conductor is a metal cover, with the metal cover being shielded in particular by the magnetic sheet, by using the magnetic shielding effect by the main metal plate of the electronic apparatus, its NFC communication characteristics can be enhanced.

Also, in another mode of the present invention, an opening may be formed in an area of the metal cover. In this manner, when an opening is formed in the metal cover, with the metal cover being shielded in particular by the magnetic sheet, by using the magnetic shielding effect by the main metal plate of the electronic apparatus, its NFC communication characteristics can be enhanced.

Also, in another mode of the present invention, the loop antenna may be divided into two as one side part and other side part via a center line in a longitudinal direction, the magnetic sheet may include a first magnetic sheet extending from the center part of the loop antenna to reach ends of the one side part and the other side part in a width direction and a second magnetic sheet developed from the center part of the loop antenna toward the opposing end, and the first magnetic sheet may be provided so that one end is disposed on an upper side of the one side part when viewed from the external apparatus and a portion except the one end is disposed on a lower side of the other side part when viewed from the external apparatus. With this, the magnetic fluxes from the external apparatus collected by the second magnetic sheet can be sent to the center part of the loop antenna via the first magnetic sheet.

Also, in another mode of the present invention, the second magnetic sheet may be configured to have at least a hole part or a notch formed therein. With this, application is possible depending on the specification of the electronic apparatus where the antenna device is to be mounted.

Also, in another mode of the present invention, the hole part may formed in an area opposing the opening, and has an outer diameter smaller than the opening. With this, magnetic fluxes on the periphery of the opening sent from the external apparatus can also be reliably sent to the center part of the loop antenna.

Also, in another mode of the present invention, the first magnetic sheet and the second magnetic sheet may be configured to be integrally molded. With this, a magnetic sheet capable of more reliably collecting magnetic fluxes received from the external apparatus can be easily manufactured as having a simple structure.

Also, in another mode of the present invention, the first magnetic sheet and the second magnetic sheet may be configured to be separately molded and coupled. With this, design flexibility of a magnetic sheet capable of more reliably collecting magnetic fluxes received from the external apparatus is improved.

Also, another mode of the present invention is directed to an electronic apparatus having any of the antenna devices described above incorporated therein, the electronic apparatus being communicable with an external apparatus via an electromagnetic field signal. According to this other mode of the present invention, the communication characteristic can be improved by using the magnetic shielding effect by the main metal plate of the electronic apparatus, irrespectively of the implementation position of the antenna module including the loop antenna.

Also, another mode of the present invention is directed to an antenna device incorporated in an electronic apparatus to communicate with an external apparatus via an electromagnetic field signal, the device including a first conductor opposing the external apparatus; a loop antenna provided inside and via a predetermined space from an outer edge part of the first conductor and having an antenna coil conductively coupled to the external apparatus and coiling thereon; and a magnetic sheet formed of a magnetic material and provided as being expanded at least from a center part of the loop antenna to a portion of the outer edge part of the first conductor. According to this other mode of the present invention, magnetic fluxes from the external apparatus can be collected by the magnetic sheet provided as being expanded and induced to the center part of the loop antenna. Thus, by using the magnetic shielding effect by the main metal plate of the electronic apparatus, its NFC communication characteristic can be improved, irrespectively of the implementation position of the antenna module including the loop antenna.

Here, in another mode of the present invention, the loop antenna may be divided into two as one side part and other side part via a center line in a longitudinal direction, the magnetic sheet may include a first magnetic sheet extending from the center part of the loop antenna to reach ends of the one side part and the other side part in a width direction and a second magnetic sheet extending from the center part of the loop antenna to reach the portion of the outer edge part, and the first magnetic sheet may be provided so that one end is disposed on a lower side of the one side part when viewed from the external apparatus and a portion except the one end is disposed on an upper side of the other side part when viewed from the external apparatus. With this, magnetic fluxes from the external apparatus collected by the second magnetic sheet can be sent via the first magnetic sheet to the center part of the loop antenna.

Also, in another mode of the present invention, the second magnetic sheet may be provided so as to expand from the center part toward a nearest portion of the outer edge part. With this, magnetic fluxes received from the external apparatus can be more efficiently sent to the center part of the loop antenna.

Also, in another mode of the present invention, the first magnetic sheet and the second magnetic sheet may be configured to be integrally molded. With this, a magnetic sheet capable of more reliably collecting magnetic fluxes received from the external apparatus can be easily manufactured as having a simple structure.

Also, in another mode of the present invention, the first magnetic sheet and the second magnetic sheet may be configured to be separately molded and coupled. With this, design flexibility of a magnetic sheet capable of more reliably collecting magnetic fluxes received from the external apparatus is improved.

Also, in another mode of the present invention, the second magnetic sheet may be configured to have at least a hole part or a notch formed therein. With this, application is possible depending on the specification of the electronic apparatus where the antenna device is to be mounted.

Still further, another mode of the present invention is directed to an electronic apparatus having any of the antenna devices described above incorporated therein, the electronic apparatus being communicable with an external apparatus via an electromagnetic field signal. According to this other mode of the present invention, the communication characteristic can be improved by using the magnetic shielding effect by the main metal plate of the electronic apparatus, irrespectively of the implementation position of the antenna module including the loop antenna.

As has been described above, according to one mode of the present invention, it is possible to improve a stable communication function of the antenna device including the second conductor and achieve standardization and ensure design flexibility of the antenna module including the second conductor, regardless of the internal structure of the electronic apparatus.

According to another mode of the present invention, since the first conductor included in the electronic apparatus is shielded with the magnetic sheet provided so as to develop from a portion near the outer edge part where the loop antenna is provided, the magnetic fluxes from the external apparatus can be more reliably collected and induced to the center part of the loop antenna. Thus, by using the magnetic shielding effect by the main metal plate of the electronic apparatus which is becoming small in size and multifunctional, its NFC communication characteristic can be enhanced.

Furthermore, according to another mode of the present invention, by the magnetic sheet provided as being expanded, the magnetic fluxes from the external apparatus can be collected and induced to the center part of the loop antenna of the antenna module. Thus, irrespectively of the implementation position of the antenna module, by using the magnetic shielding effect by the main metal plate of the electronic apparatus, its NFC communication characteristic can be enhanced.

BRIEF DESCRIPTION OF THE DRAWINGS

FIG. 22B

DETAILED DESCRIPTION OF THE INVENTION

In the following, suitable embodiments of the present invention are described in detail. Note that the present embodiments described below do not unreasonably restrict the contents of the present invention described in the claims and all structures described in the present embodiments are not necessarily indispensable as solution means of the present invention.

First Embodiment

Figure 1:
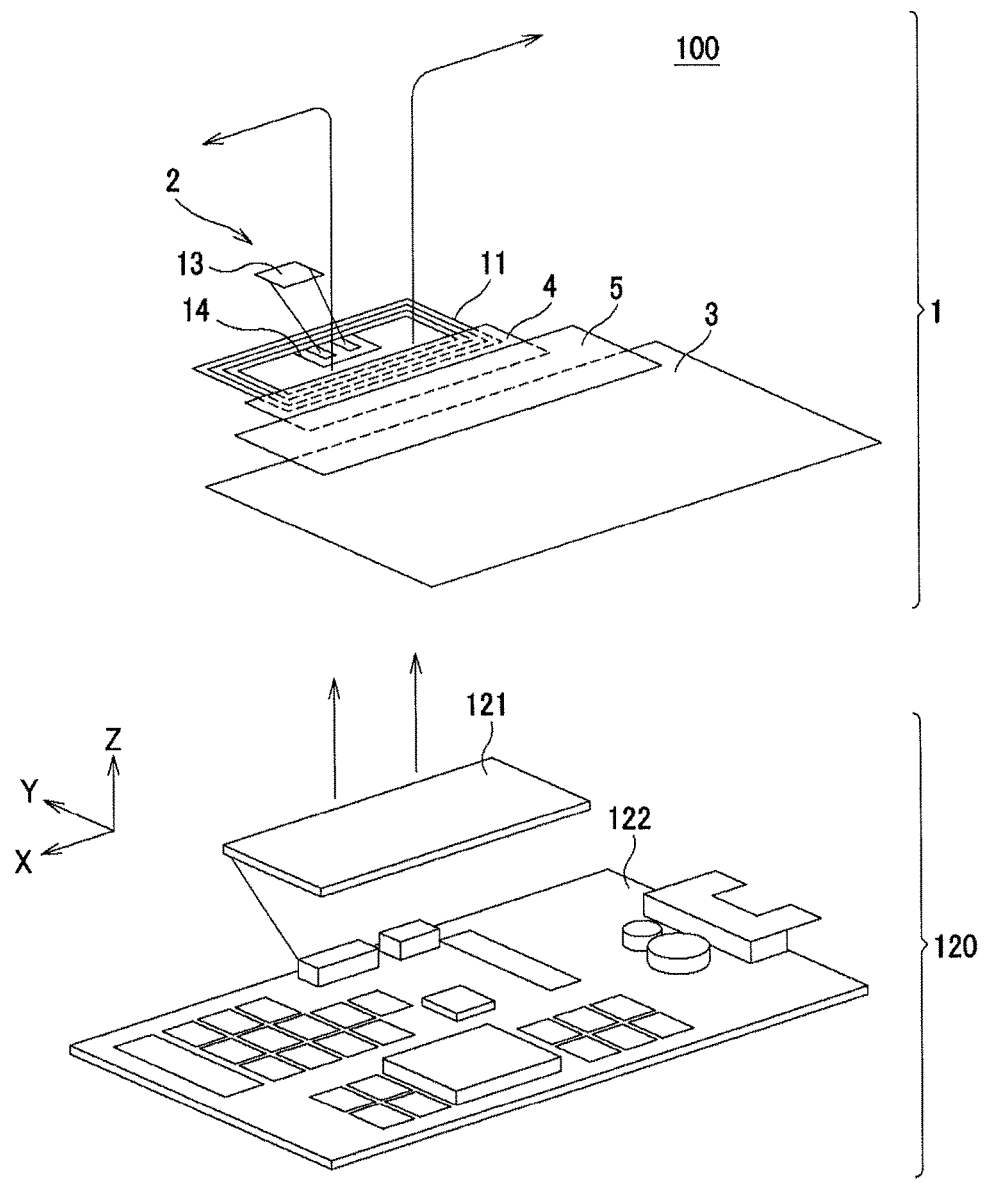
FIG. 1 is a perspective view depicting schematic structure of a wireless communication system to which an antenna device according to a first embodiment of the present invention is applied.
Figure 2:
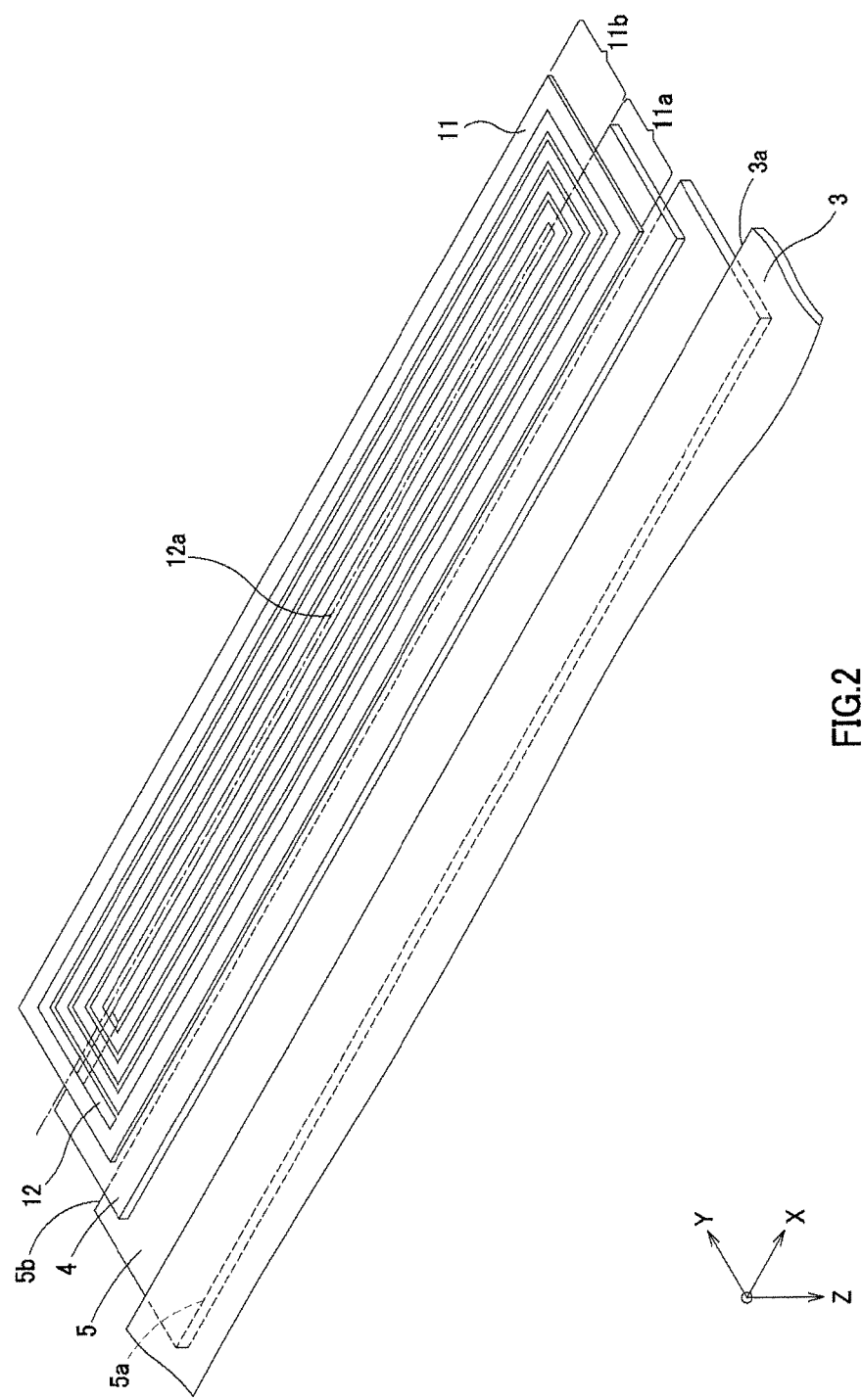
FIG. 2 is a perspective view depicting structure of the antenna device according to the first embodiment of the present invention.

First, the structure of an antenna device according to a first embodiment of the present invention is described by using the drawings. FIG. 1 is a perspective view depicting schematic structure of a wireless communication system to which the antenna device according to the first embodiment of the present invention is applied, and FIG. 2 is a perspective view depicting structure of the antenna device according to the first embodiment of the present invention.

An antenna device 1 according to the present embodiment is a device incorporated in an electronic apparatus to communicate with an external apparatus via an electromagnetic field signal, and is used, for example, as being incorporated in a wireless communication system 100 for RFID as depicted in FIG. 1.

The wireless communication system 100 includes the antenna device 1 included in the electronic apparatus and a reader/writer 120 as an external apparatus which makes an access to the antenna device 1. Here, the antenna device 1 and the reader/writer 120 are assumed to be disposed so as to oppose each other on a xy plane of a three-dimensional orthogonal coordinate system xyz.

The reader/writer 120 functions as a transmitter which transmits a magnetic field in a z-axis direction to the antenna device 1 opposing each other on the xy plane, and specifically includes an antenna 121 which transmits a magnetic field toward the antenna device 1 and a control board 122 which communicates with the antenna device 1 inductively coupled via the antenna 121.

That is, the reader/writer 120 has disposed thereon the control board 122 electrically connected to the antenna 121. On this control board 122, a control circuit formed of electronic components such as one or plurality of integrated circuit chips is implemented. This control circuit performs various processes based on data received from the antenna device 1.

For example, when transmitting data to the antenna device 1, the control circuit encodes the data, modulates a carrier wave at a predetermined frequency (for example, 13.56 MHz) based on the encoded data, amplifies the modulated modulation signal, and drives the antenna 121 with the amplified modulation signal. Also, when reading data from the antenna device 1, the control circuit amplifies a modulation signal of data received at the antenna 121, demodulates the amplified modulation signal of the data, and decodes the demodulated data.

Note that an encoding scheme and a modulation scheme for use in general readers/writers are used in the control circuit and, for example, the Manchester encoding scheme and ASK (Amplitude Shift Keying) modulation scheme are used. Also, while the antenna device and so forth in a non-contact communication system are described below, it is assumed that application can be similarly made also for a non-contact charging system such as Qi (chee).

The antenna device 1 is incorporated inside a housing of the electronic apparatus such as a portable telephone disposed so as to oppose the reader/writer 120 on the xy plane at the time of communication to communicate with the external apparatus via an electromagnetic field signal. The antenna device 1 of the present embodiment includes, as depicted in FIG. 1, an antenna module 2, a metal plate 3, an antenna metal foil 4, and a connection metal foil 5. In the present embodiment, the antenna device 1 has a feature in which the antenna module 2 partially overlaps with the antenna metal foil 4, the antenna module 2 including the antenna metal foil 4 is provided as being separated from the metal plate 3 with a predetermined space, and the metal plate 3 and the antenna metal foil 4 are coupled by the connection metal foil 5.

The antenna module 2 is provided inside the housing of the electronic apparatus to communicate with the inductively-coupled reader/writer 120. In the present embodiment, as depicted in FIG. 1, the antenna module 2 includes a loop antenna 11, a communication processing unit 13, and a terminal unit 14, with the loop antenna 11 partially overlapping with the antenna metal foil 4.

The loop antenna 11 is provided inside the housing of the electronic apparatus, and has an antenna coil 12 coiling thereon, which becomes communicable with the reader/writer 120 by being inductively coupled to the reader/writer 120 as an external apparatus. The loop antenna 11 has implemented thereon the antenna coil 12 formed by performing patterning process or the like on a flexible conductor wire such as, for example, a flexible flat cable, and the terminal unit 14 for electrically connecting the antenna coil 12 and the communication processing unit 13.

The loop antenna 11 has a substantially rectangular shape as depicted in FIG. 2, and one conductor wire of the antenna coil 12 is coiled along the outer shape. Note that while the loop antenna 11 has a substantially rectangular shape in the present embodiment, the shape may be another shape such as an oval. Also, it is assumed that a "longitudinal direction" of the loop antenna 11 in the specification indicates a direction in which its length or outer diameter indicates a maximum value, indicating a long-side direction in the case of a substantially rectangular shape and a major-axis direction in the case of a substantially oval shape.

The loop antenna 11 is disposed so that, as depicted in FIG. 2, a main surface where the antenna coil 12 coils opposes the reader/writer 120 on the xy plane at the time of communication. Also, the loop antenna 11 has one side part 11a and other side part 11b, with a center line 12a in the longitudinal direction taken as a boundary. In the one side part 11a, a direction in which currents along the longitudinal direction in the conductor wire of the antenna coil 12 are oriented to flow in the same direction is taken as a coiling direction. In the other side part 11b, a direction in which currents along the longitudinal direction in the conductor wire of the antenna coil 12 are oriented to flow in an opposite direction is taken as a coiling direction. And, the loop antenna 11 is disposed, with one side edge along the longitudinal direction oriented toward a metal plate 3 side, that is, with either one of the one side part 11a and the other side part 11b oriented toward a metal plate 3 side.

Upon receiving a magnetic field transmitted from the reader/writer 120, the antenna coil 12 is magnetically coupled to the reader/writer 120 by inductive coupling to receive a modulated electromagnetic wave and supply a reception signal to the communication processing unit 13 via the terminal unit 14.

The communication processing unit 13 is driven by current flowing through the antenna coil 12 to communicate with the reader/writer 120. Specifically, the communication processing unit 13 demodulates a received modulation signal, decodes demodulated data, and writes the decoded data in an inner memory included in the communication processing unit 13. Also, the communication processing unit 13 reads, from the inner memory, data to be transmitted to the reader/writer 120, encodes the read data, modulates a carrier wave based on the encoded data, and transmits, to the reader/writer 120, a modulated electric wave via the antenna coil 12 magnetically coupled by inductive coupling. Note that the communication processing unit 13 may be driven not by electric power flowing through the antenna coil 12 but by electric power supplied from electric power supply means such as a battery pack incorporated in the electronic apparatus or an external power supply.

The metal plate 3 is provided inside the housing of the electronic apparatus, and serves as a first conductor opposing the reader/writer 120 as an external apparatus. The metal plate 3 is provided inside the housing of the electronic apparatus such as, for example, a portable telephone, smartphone, or tablet PC, and configures a first conductor opposing the reader/writer 120 at the time of communication of the antenna module 2. As this first conductor, for example, a metal cover attached to an inner surface of a housing of a smartphone, a metal housing of a battery pack accommodated in a smartphone, a metal plate on a back surface of a liquid-crystal module of a tablet PC, or the like applies.

The antenna metal foil 4 is provided as being separated from the metal plate 3 as the first conductor with a predetermined space, and is a sheet-like second conductor partially overlapping or making contact with a surface of the loop antenna 11 opposite to a surface opposing the reader/writer 120. In the present embodiment, the antenna metal foil 4 is formed so as to overlap with the one side part 11a of the loop antenna 11 over the full length and, preferably, have a size in the longitudinal direction is substantially equal to and slightly larger than the size of the loop antenna 11. That is, since the antenna metal foil 4 has a minimum size required for improvement in communication characteristic of the antenna device 1, it is possible to achieve standardization and improvement in design flexibility of the antenna module 2 including the antenna metal foil 4.

Note that while the antenna metal foil 4 has a substantially rectangular shape in the present embodiment, the shape may be another shape such as an oval. Also, it is assumed that the "longitudinal direction" of the antenna metal foil 4 in the specification indicates a direction in which its length or outer diameter indicates a maximum value, indicating a long-side direction in the case of a substantially rectangular shape and a major-axis direction in the case of a substantially oval shape.

The connection metal foil 5 is a sheet-like third conductor provided between the metal plate 3 as the first conductor and the antenna metal foil 4 as the second conductor. In the present embodiment, the connection metal foil 5 has one end 5a overlapping or making contact with the metal plate 3, and other end 5b partially overlapping or making contact with the antenna metal foil 4.

In this manner, with the connection metal foil 5 being provided between the metal plate 3 and the antenna metal foil 4, even if the antenna metal foil 4 is configured to be separated away from the metal plate 3 of the electronic apparatus, the antenna module 2 overlapping with the antenna metal foil 4 can use a magnetic shielding effect by the metal plate 3 via the connection metal foil 5. That is, with the connection metal foil 5 coupling the metal plate 3 and the antenna metal foil 4, the performance of the antenna device 1 such as a small-sized NFC antenna using the magnetic shielding effect by the metal plate 3 can be enhanced to maximum, regardless of the internal structure of the electronic apparatus. Also, with the connection metal foil 5 coupling the metal plate 3 and the antenna metal foil 4, design flexibility of the electronic apparatus including the antenna module 2 is improved.

As described above, in the present embodiment, between the loop antenna 11 and the metal plate 3, the antenna metal foil 4 is provided as a sheet-like second conductor via the connection metal foil 5 overlapping or making contact with the metal plate 3. The antenna metal foil 4 partially overlaps with the surface of the loop antenna 11 opposite to the surface opposing the reader/writer 120. By overlapping with part of the loop antenna 11, the antenna metal foil 4 inhibits conductive coupling in an overlapping region by causing the magnetic field to bouncing back in the part of the overlapping loop antenna 11, and also promotes magnetic flux concentration on a non-overlapping region, thereby improving communication performance.

That is, in the loop antenna 11, magnetic fluxes from the reader/writer 120 passing through the antenna coil 12 coiling on the main surface of the board cause currents in opposite directions in the one side part 11a where the conductor wire of the antenna coil 12 coils in one direction and the other side part 11a where the conductor wire of the antenna coil 12 coils in another direction and, as a result, efficient coupling cannot be made.

Hence, in the antenna device 1 of the present embodiment, with the antenna metal foil 4 partially overlapping with the surface of the loop antenna 11 opposite to the surface opposing the reader/writer 120, the magnetic field in the overlapping region is caused to bounce back to inhibit inductive coupling in the overlapping region, and a current occurring in a non-overlapping region can be efficiently transmitted. Also, in the antenna device 1, with the antenna metal foil 4 partially overlapping with the surface of the loop antenna 11 opposite to the surface opposing the reader/writer 120, magnetic fluxes are concentrated on the non-overlapping region, thereby allowing promotion of efficient power generation in that region.

Also, in the antenna device 1, with the antenna metal foil 4 also overlapping or making contact with the connection metal foil 5, magnetic fluxes from the metal plate 3 via the connection metal foil 5 can be induced without leakage to a region of the loop antenna 11 where the antenna metal foil 4 does not overlap, and efficient inductive coupling can be made. That is, a structure can be achieved in which an end 3a of the metal plate 3 is equivalently disposed on the center line 12a of the antenna coil 12 of the loop antenna 11. Furthermore, with the antenna metal foil 4 overlapping also with the connection metal foil 5, the antenna device 1 can prevent occurrence of current by inductive coupling in a part where the antenna metal foil 4 overlaps due to a leakage magnetic flux from the metal plate 3 via the connection metal foil 5.

As the antenna metal foil 4 and the connection metal foil 5, a highly-conducting body such as, for example, a copper foil is preferably used, but a highly-conducting body may not be necessarily used. That is, the antenna metal foil 4 and the connection metal foil 5 may be formed of at least a material such as a metal with conductivity. Also, in the antenna metal foil 4 and the connection metal foil 5, the thickness is appropriately determined depending on a frequency of communication between the antenna device 1 and the reader/writer 120. For example, at a communication frequency of 13.56 MHz, a metal foil having a thickness of 20 μm to 30 μm can be used.

Note that as long as the antenna metal foil 4 overlaps with the connection metal foil 5 and the loop antenna 11, it is not necessarily required to make contact with them. However, the antenna metal foil 4 is more advantageous for a coupling coefficient as being closer to the connection metal foil 5 and the loop antenna 11, and therefore is preferably close to or in contact with them.

Also, the antenna metal foil 4 preferably overlaps with, as depicted in FIG. 2, an end of the one side part 11a of the loop antenna 11 to the center line 12a of the antenna coil 12. With this, the antenna metal foil 4 inhibits coupling in the one side part 11a of the loop antenna 11 and relatively decreases the amount of current oriented oppositely to the current occurring in the other side part 11b. And, in addition to that, magnetic fluxes are induced from the one side part 11a to the other side part 11b of the loop antenna 11 to promote coupling in the other side part 11b, thereby allowing an improvement in communication characteristic.

Furthermore, the antenna metal foil 4 preferably has, as depicted in FIG. 2, a width equal to or longer than the longitudinal direction of the one side part 11a of the loop antenna 11 to overlap over the entire longitudinal direction of the one side part 11a of the loop antenna 11. Also with this, the antenna metal foil 4 inhibits inductive coupling in one side part 11a of the loop antenna 11 via the third conductor 5, and relatively decreases the amount of current oriented oppositely to the current occurring in the other side part 11b. Also at the same time, magnetic fluxes are induced from one side part 11a to the other side part 11b of the loop antenna 11 to promote coupling in the other side part 11b, thereby allowing an improvement in communication characteristic.

Note that the loop antenna 11 may be coiled so that the number of lines of the antenna coil 12 on the other side part 11b where the antenna metal foil 4 does not overlap (for example, four) is larger than the number of lines of the antenna coil 12 on the one side part 11a where the antenna metal foil 4 overlaps (for example, three). That is, by placing a starting end and a termination end of one conductive wire of the antenna coil on the other side part 11b, coil conductive wires can coil more on the other side part 11b than on the one side part 11a of the loop antenna 11 across the center line 12a of the antenna coil 12. With this, the number of lines of the coil conductively coupled to the magnetic fluxes from the reader/writer 120 can be increased, and a favorable communication characteristic can be achieved.

Also, in the antenna device 1, a plurality of antenna metal foils 4 obtained by division into two or more may overlap between the connection metal foil 5 and the loop antenna 11. With this, even if the antenna metal foil 4 cannot be provided between the connection metal foil 5 and the loop antenna 11 because, for example, another member such as a lens barrel of a camera module is disposed, the antenna metal foil 4 is provided at a position avoiding another member such as a lens barrel, thereby achieving an improvement in communication characteristic. Also, in the antenna device 1, the antenna metal foil 4 having formed therein a hole part (not depicted) or notched part (not depicted) corresponding to another member such as a lens barrel may be used.

Figure 3:
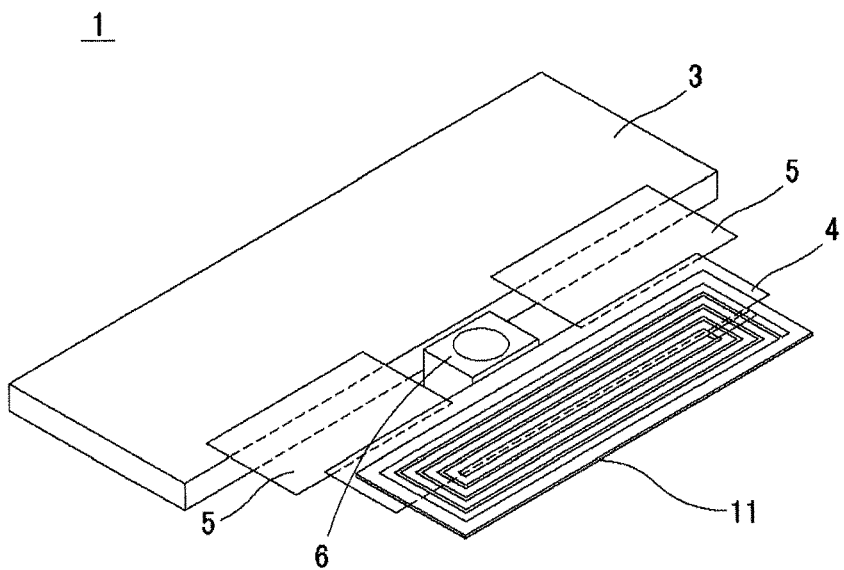
FIG. 3 is a perspective view depicting one example of a modification example of a third conductor included in the antenna device according to the first embodiment of the present invention.

Furthermore, in the antenna device 1, as depicted in FIG. 3, a plurality of connection metal foils 5 obtained by division into two or more may overlap between the antenna metal foil 4 where the loop antenna 11 overlaps and the metal plate 3. With the connection metal foil 5 configured by plural division in this manner, even if the connection metal foil 5 cannot be directly provided between the antenna metal foil 4 where the loop antenna 11 overlaps and the metal plate 3 because, for example, a lens barrel 6 of a camera module is disposed, the antenna metal foil 4 where the loop antenna 11 overlaps and the metal plate 3 can be connected so as to detour around the lens barrel 6. That is, with the connection metal foils 5 obtained by plural division being provided at a position avoiding another member such as the lens barrel 6, the communication characteristic can be improved while the function of that member is kept. Note that while the case is depicted in FIG. 3 in which the connection metal foil 5 is divided into two, the structure may be obtained by division into three or more, depending on the number of other members such as the lens barrel 6 for installation and the installation place.

Figure 4:
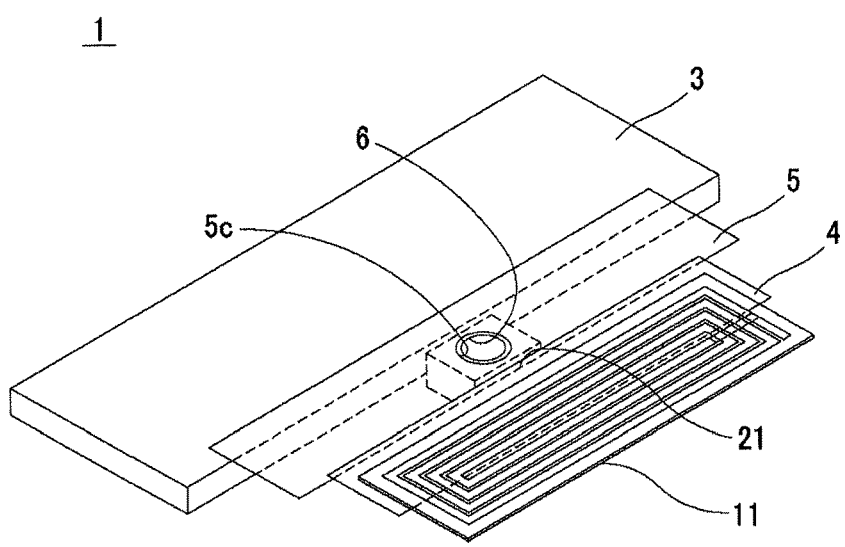
FIG. 4 is a perspective view depicting one example of another modification example of the third conductor included in the antenna device according to the first embodiment of the present invention.
Figure 5:
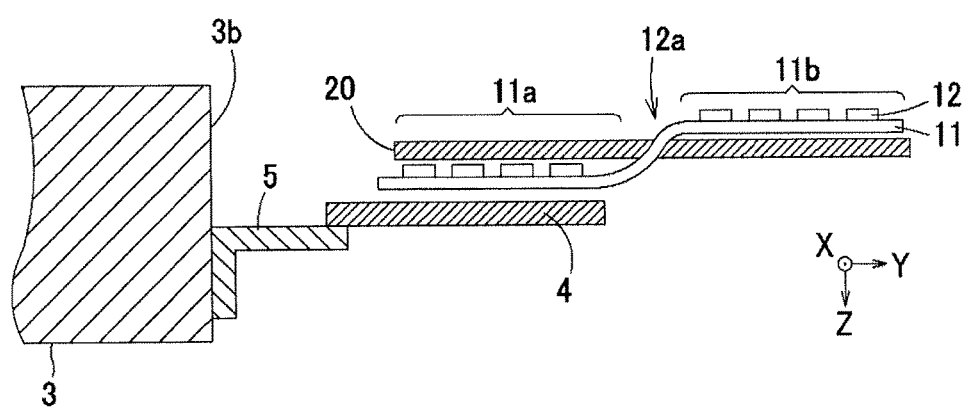
FIG. 5 is a partial side view depicting one example of the other modification example of the third conductor included in the antenna device according to the first embodiment of the present invention.
Figure 6A:
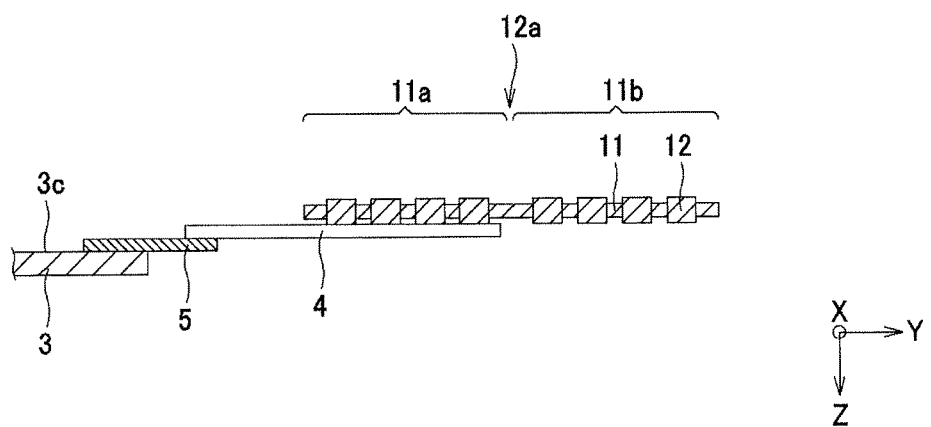
FIG. 6A and FIG. 6B are partial side views depicting one example of installation mode of the third conductor included in the antenna device according to the first embodiment of the present invention.
Figure 6B:
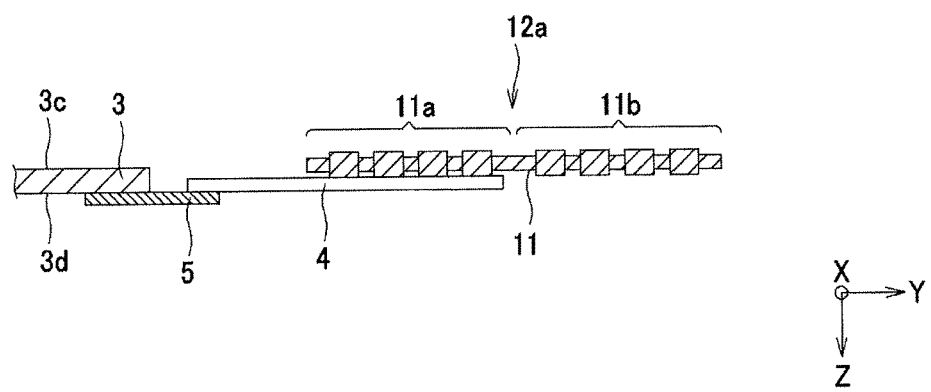

Also, in the antenna device 1, as depicted in FIG. 4, the connection metal foil 5 having formed therein a hole part 5c or notched part (not depicted) corresponding to another member such as the lens barrel 6 may be used. Furthermore, the connection metal foil 5 may be configured, as depicted in FIG. 5, so as to overlap or make contact with a side surface part 3b of the metal plate 3 as the first conductor. Here, the structure may be such that the connection metal foil 5 is configured as being folded in a substantially L shape, the loop antenna 11 has an opening formed in the center line 12a of the antenna coil 12 over the longitudinal direction, and a magnetic sheet 20 is inserted into this opening. Also, the connection metal foil 5 may be configured, as depicted in FIG. 6A, so as to overlap or make contact with part of one surface 3c of the metal plate 3 opposing the external apparatus 120. Furthermore, the connection metal foil 5 may be configured, as depicted in FIG. 6B, so as to overlap or make contact with part of a surface 3d opposite to the one surface 3c of the metal plate 3 opposing the external apparatus 120. In this manner, with the connection metal foil 5 being provided between the antenna metal foil 4 and the metal plate 3, design flexibility of the antenna module 2 (refer to FIG. 1) including the antenna metal foil 4 is improved.

In the present embodiment, with the connection metal foil 5 being provided between the metal plate 3 and the antenna metal foil 4 overlapping with the antenna module 2, even if the antenna metal foil 4 is configured to be separated away from the metal plate 3 of the electronic apparatus, the magnetic shielding effect by the metal plate 3 of the antenna module 2 overlapping with the antenna metal foil 4 can be used. That is, regardless of the internal structure of the electronic apparatus, the performance of the antenna device 1 using the magnetic shielding effect by the metal plate 3 is enhanced to maximum and design flexibility of the electronic apparatus including the antenna module 2 is improved.

Also, in the present embodiment, since the connection metal foil 5 is provided between the metal plate 3 and the antenna metal foil 4 where the antenna module 2 overlaps, the metal plate 3 and the antenna module 2 where the antenna metal foil 4 overlaps can be reliably connected, irrespectively of the size of the antenna metal foil 4. That is, even if the antenna metal foil 4 where the antenna module 2 overlaps is uniformly formed in a predetermined size, the metal plate 3 and the antenna module 2 can be reliably connected, regardless of the internal structure of the electronic apparatus. Thus, standardization of the antenna module 2 including the antenna metal foil 4 can be easily made.

Furthermore, in the present embodiment, the performance of the antenna device 1 using the magnetic shielding effect by the metal plate 3 can be maximized, regardless of the internal structure and metal components of the electronic apparatus such as an information terminal. Therefore it is possible to decrease changes in electrical characteristic such as inductances before and after a cover and an antenna are attached to the electronic apparatus. This can significantly contribute also to simplification of adjustment of resonant frequency of the antenna device 1 such as an NFC antenna.

Figure 7:
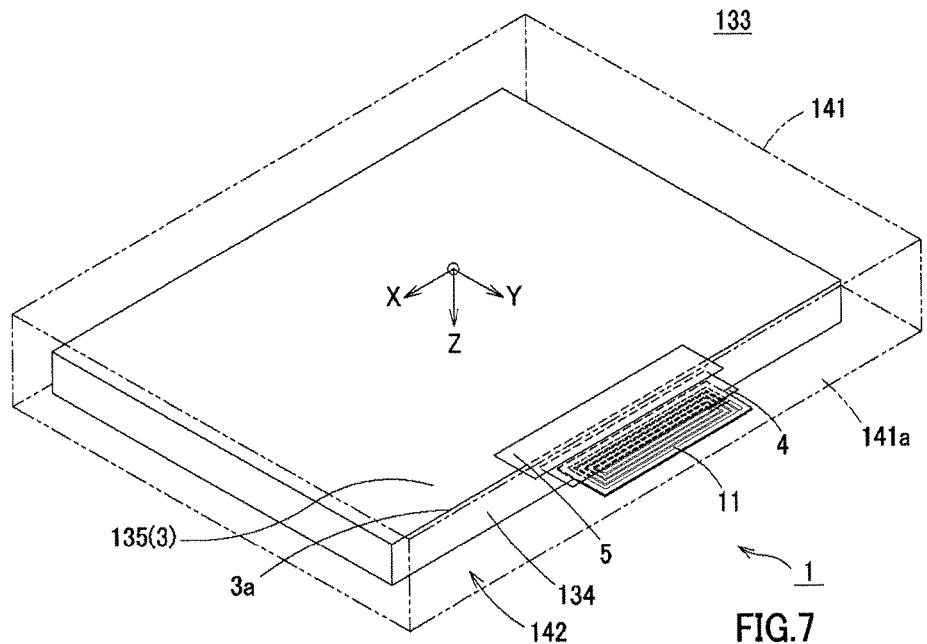
FIG. 7 is a perspective view depicting one example of an inner part of an electronic apparatus to which the antenna device according to the first embodiment of the present invention is applied.

Next, an example of the electronic apparatus to which the antenna device according to the first embodiment of the present invention is applied is described by using the drawings. FIG. 7 is a perspective view depicting one example of an inner part of the electronic apparatus to which the antenna device according to the first embodiment of the present invention is applied, and FIG. 8 is a partial side view depicting one example of the inner part of the electronic apparatus to which the antenna device according to the first embodiment of the present invention is applied.

In the following, description is made by mainly taking a smartphone 133 as an example as an electronic apparatus and taking, in a metal housing 135 of a battery pack 134 accommodated in this smartphone 133, a main surface opposing the reader/writer 120 at the time of communication as the metal plate 3 configuring the first conductor.

In view of decreasing the size of the smartphone 133 and achieving a favorable communication characteristic with the reader/writer 120 when incorporated into the smartphone 133, the loop antenna 11 of the antenna module 2 is disposed on an xy plane of a three-dimensional orthogonal coordinate system xyz as depicted in FIG. 7 and, for example, in a space 142 between the battery pack 134 provided inside an outer housing 141 of the smartphone 133 and an inner circumferential wall 141a of the outer housing 141. Specifically, as depicted in FIG. 8, the loop antenna 11 is disposed between the end 3a of the metal plate 3 of the metal housing 135 of the battery back 134 opposing the reader/writer 120 and the inner circumferential wall 141a of the outer housing 141.

Figure 8:
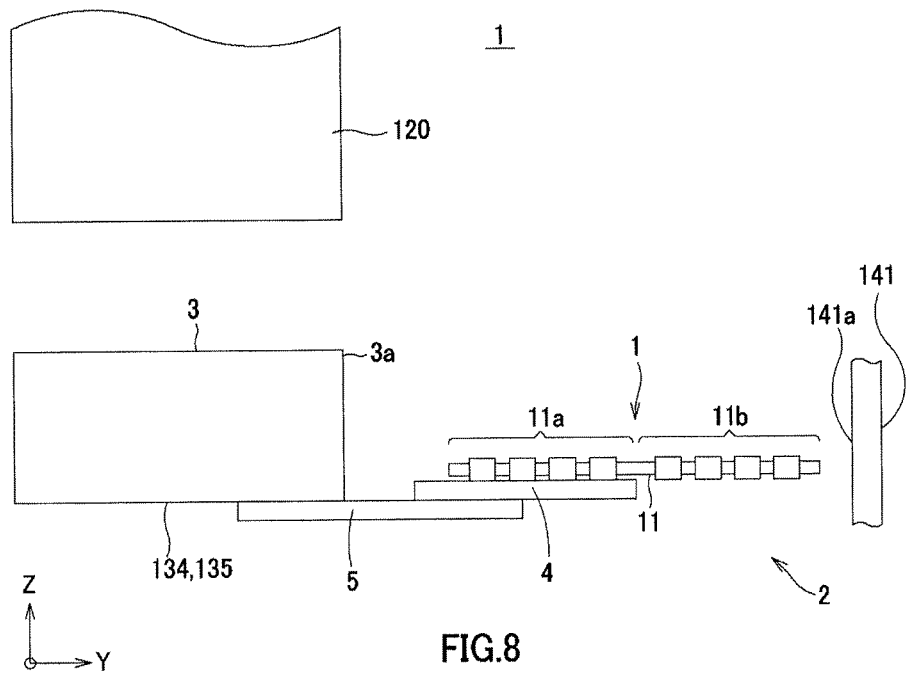
FIG. 8 is a partial side view depicting one example of the inner part of the electronic apparatus to which the antenna device according to the first embodiment of the present invention is applied.

Here, as depicted in FIG. 8, since the metal plate 3 configuring the metal housing 135 of the battery pack 134 disposed in the smartphone 133 lets electricity flow with a relatively high degree, if an alternating magnetic field is applied from outside, an eddy current occurs and causes the magnetic field to bounce back. In a study of a magnetic field distribution when an alternating magnetic field is applied from outside as described above, the apparatus has a characteristic in which the magnetic field of the end 3a of the metal plate 3 of the battery back 134 opposing the reader/writer 120 is strong.

To achieve a favorable communication characteristic by using the characteristic of magnetic intensity inside a housing 131 of the smartphone 133, the loop antenna 11 of the antenna module 2 is disposed so that, for example, as depicted in FIG. 2, the center 12a of the antenna coil 12 parallel with the z axis passes through the space 142 between the end 3a of the metal plate 3 and the inner circumferential wall 141a of the outer housing 141 and one side edge in the longitudinal direction is oriented to an end 3a side of the metal plate 3, that is, the one side part 11a is oriented to an end 3a side of the metal plate 3.

In the present embodiment, the loop antenna 11 is provided at a position separated from and not in contact with the end 3a of the metal plate 3. In this manner, even when the metal plate 3 and the loop antenna 11 are disposed as being separated due to restrictions on the layout inside the housing of the electronic apparatus, coupling is made by the antenna metal foil 4 and the connection metal foil 5 overlapping over the metal plate 3 and the loop antenna 11, thereby obtaining a favorable communication characteristic. That is, by incorporating the antenna device 1 according to the present embodiment into the electronic apparatus such as the smartphone 133, a communication characteristic with respect to the external apparatus such as the reader/writer 120 can be enhanced by using concentration of magnetic fluxes by the magnetic shielding effect of the metal plate 3 such as a board.

Second Embodiment

Figure 9:
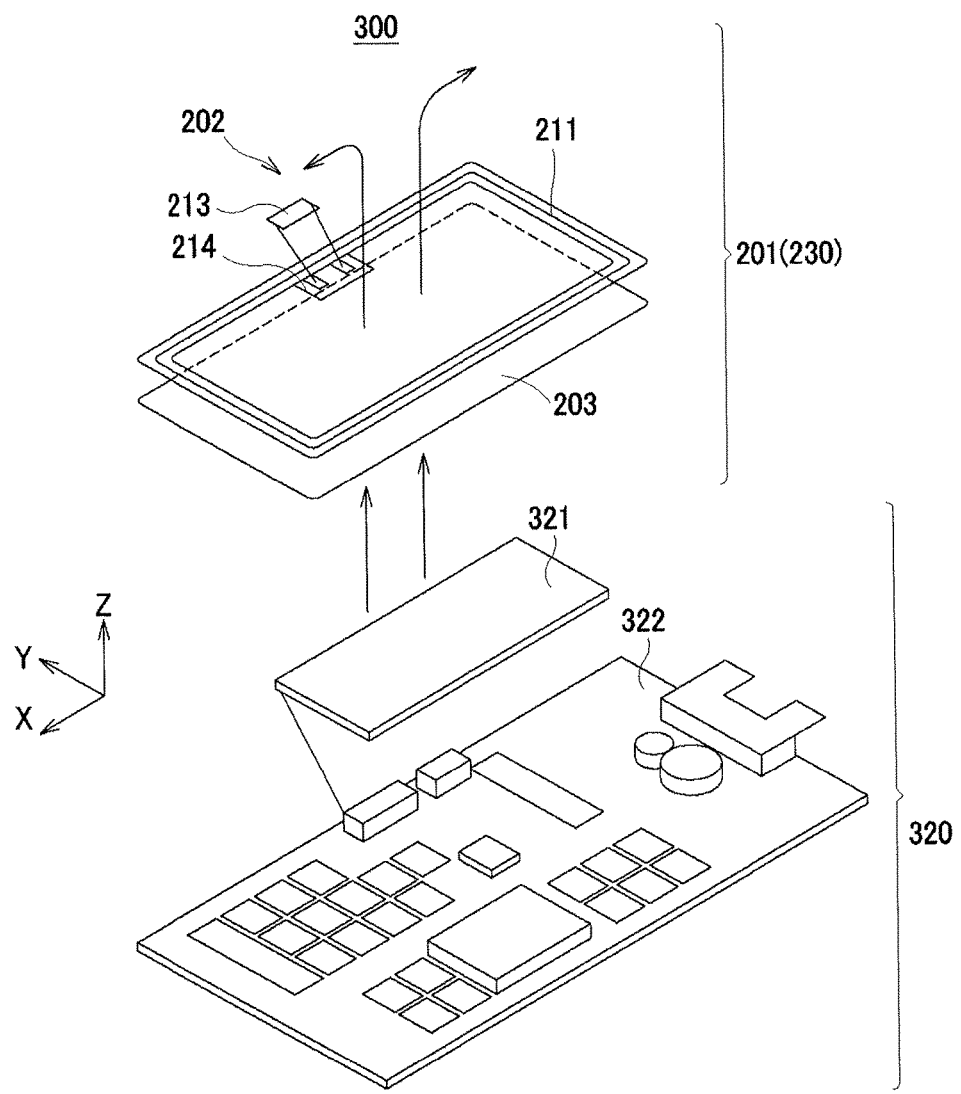
FIG. 9 is a perspective view depicting schematic structure of a wireless communication system to which an antenna device according to a second embodiment of the present invention is applied.
Figure 10A:
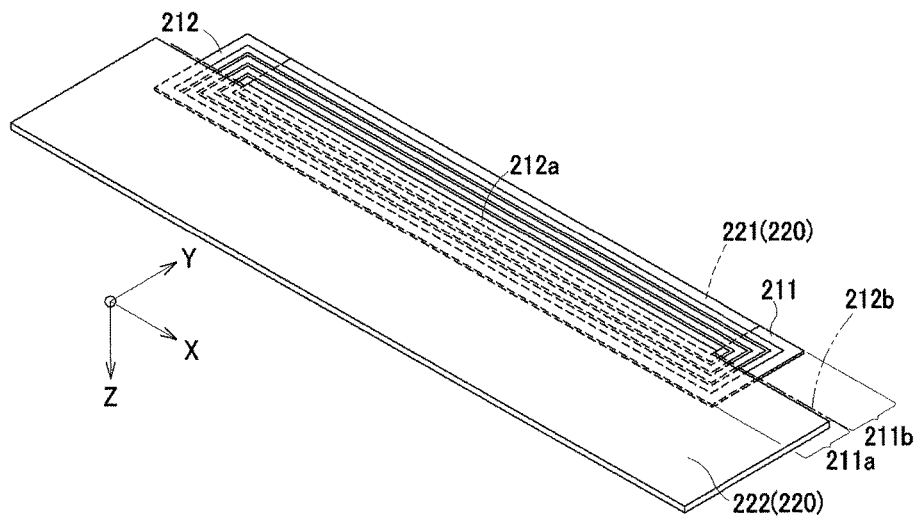
FIG. 10A is a perspective view depicting an arrangement relation between a loop antenna and a magnetic sheet in the antenna device according to the second embodiment of the present invention.
Figure 10B:
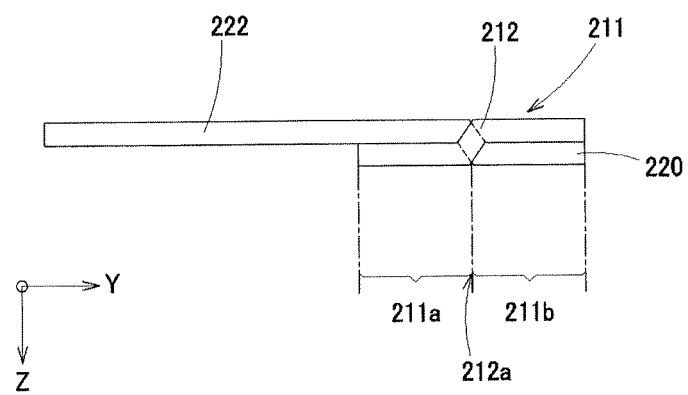
FIG. 10B is a side view depicting the arrangement relation between the loop antenna and the magnetic sheet in the antenna device according to the second embodiment of the present invention.
Figure 11A:
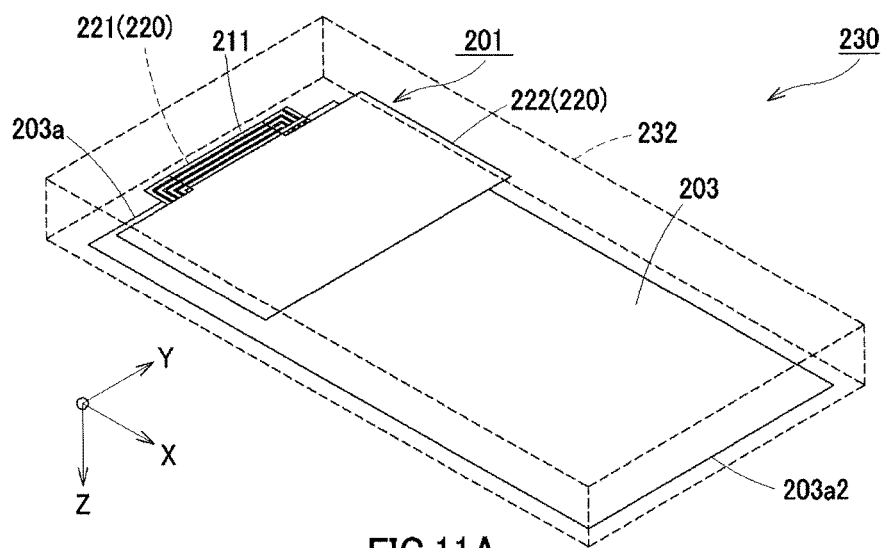
FIG. 11A is a perspective view depicting one example of an electronic apparatus including the antenna device according to the second embodiment of the present invention.
Figure 11B:
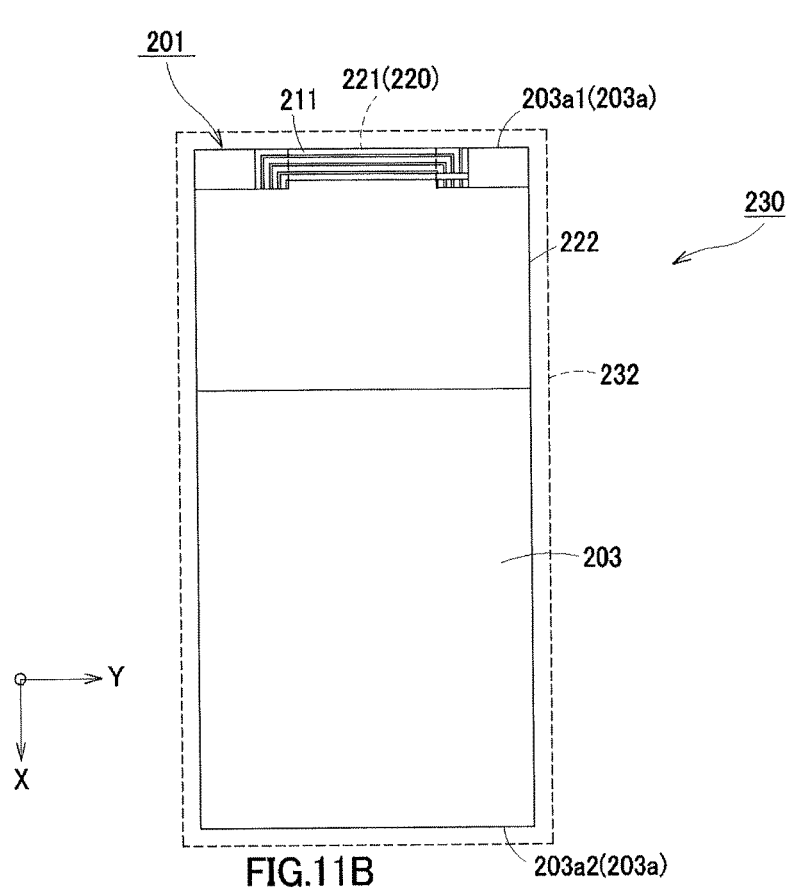
FIG. 11B is a plan view depicting one example of the electronic apparatus including the antenna device according to the second embodiment of the present invention.

Next, the structure of an antenna device according to a second embodiment of the present invention is described by using the drawings. FIG. 9 is a perspective view depicting schematic structure of a wireless communication system to which an antenna device according to the second embodiment of the present invention is applied, FIG. 10A is a perspective view depicting an arrangement relation between a loop antenna and a magnetic sheet in the antenna device according to the second embodiment of the present invention, FIG. 10B is a side view depicting the arrangement relation between the loop antenna and the magnetic sheet in the antenna device according to the second embodiment of the present invention, FIG. 11A is a perspective view depicting one example of an electronic apparatus including the antenna device according to the second embodiment of the present invention, and FIG. 11B is a plan view depicting one example of the electronic apparatus including the antenna device according to the second embodiment of the present invention.

An antenna device 201 according to the present embodiment is a device incorporated in an electronic apparatus 230 to communicate with an external apparatus via an electromagnetic field signal and is used, for example, as being incorporated in a wireless communication system 300 for RFID as depicted in FIG. 9.

The wireless communication system 300 includes, as depicted in FIG. 9, the antenna device 201 included in the electronic apparatus 230 and a reader/writer 320 as an external apparatus which makes an access to the antenna device 201. Here, the antenna device 201 and the reader/writer 320 are assumed to be disposed so as to oppose each other on a xy plane of a three-dimensional orthogonal coordinate system xyz.

The reader/writer 320 functions as a transmitter which transmits a magnetic field in a z-axis direction to the antenna device 201 opposing each other on the xy plane, and specifically includes an antenna 321 which transmits a magnetic field toward the antenna device 201 and a control board 322 which communicates with the antenna device 201 inductively coupled via the antenna 321.

That is, the reader/writer 320 has disposed thereon the control board 322 electrically connected to the antenna 321. On this control board 322, a control circuit formed of electronic components such as one or plurality of integrated circuit chips is implemented. This control circuit performs various processes based on data received from the antenna device 201.

For example, when transmitting data to the antenna device 201, the control circuit encodes the data, modulates a carrier wave at a predetermined frequency (for example, 13.56 MHz) based on the encoded data, amplifies the modulated modulation signal, and drives the antenna 321 with the amplified modulation signal. Also, when reading data from the antenna device 201, the control circuit amplifies a modulation signal of data received at the antenna 321, demodulates the amplified modulation signal of the data, and decodes the demodulated data.

Note that an encoding scheme and a modulation scheme for use in general readers/writers are used in the control circuit and, for example, the Manchester encoding scheme and ASK (Amplitude Shift Keying) modulation scheme are used. Also, while the antenna device and so forth in a non-contact communication system are described below, it is assumed that application can be similarly made also for a non-contact charging system such as Qi (chee).

The antenna device 201 is incorporated inside a housing 232 (refer to FIG. 11A) of the electronic apparatus 230 such as a portable telephone disposed so as to oppose the reader/writer 320 on the xy plane at the time of communication to communicate with the reader/writer 320 as the external apparatus via an electromagnetic field signal. The antenna device 201 of the present embodiment includes an antenna module 202, a metal plate 203, and a magnetic sheet 220 (refer to FIG. 10A).

The antenna module 202 is provided inside the housing 232 of the electronic apparatus 230 to communicate with the inductively-coupled reader/writer 320. In the present embodiment, as depicted in FIG. 9, the antenna module 202 includes a loop antenna 211, a communication processing unit 213, and a terminal unit 214.

The loop antenna 211 is provided inside the housing 232 of the electronic apparatus 230, and has an antenna coil 212 (refer to FIG. 10A) coiling thereon, which becomes communicable with the reader/writer 320 by being inductively coupled to the reader/writer 320 as an external apparatus. In the present embodiment, as depicted in FIG. 11A and FIG. 11B, the loop antenna 211 is provided to any location near an outer edge part 203a of the metal plate 203 as a first conductor. That is, as depicted in FIG. 11B, the loop antenna 211 is provided near one side 203a1 of the outer edge part 203a of the metal plate 203. As depicted in FIG. 9, the loop antenna 211 has implemented thereon the antenna coil 212 formed by patterning process or the like on a flexible conductor wire such as, for example, a flexible flat cable, and the terminal unit 214 for electrically connecting the antenna coil 212 and the communication processing unit 213. Note that "near the outer edge part 203a of the metal plate 203" in the specification refers to a space region including a portion straight above the outer edge part 203a of the metal plate 203 to a region in a short distance from the outer edge part 203a.

The loop antenna 211 has a substantially rectangular shape as depicted in FIG. 10A, and one conductor wire of the antenna coil 212 is coiled along the outer shape, and its center part 212a is an opening. Note that while the loop antenna 211 has a substantially rectangular shape in the present embodiment, the shape may be another shape such as an oval. Also, it is assumed that a "longitudinal direction" of the loop antenna 211 in the specification indicates a direction in which its length or outer diameter indicates a maximum value, indicating a long-side direction in the case of a substantially rectangular shape and a major-axis direction in the case of a substantially oval shape.

The loop antenna 211 is disposed so that, as depicted in FIG. 10A, a main surface where the antenna coil 212 coils opposes the reader/writer 320 on the xy plane at the time of communication. Also, the loop antenna 211 has one side part 211a and other side part 211b, with a center line 212b in the longitudinal direction taken as a boundary. In the one side part 211a, a direction in which currents along the longitudinal direction in the conductor wire of the antenna coil 212 are oriented to flow in the same direction is taken as a coiling direction. In the other side part 211b, a direction in which currents along the longitudinal direction in the conductor wire of the antenna coil 212 are oriented to flow in an opposite direction is taken as a coiling direction. And, the loop antenna 211 is disposed, with one side edge along the longitudinal direction oriented toward a metal plate 203 side, that is, with either one of the one side part 211a and the other side part 211b opposing a metal plate 203 side.

Upon receiving a magnetic field transmitted from the reader/writer 320, the antenna coil 212 is magnetically coupled to the reader/writer 320 by inductive coupling to receive a modulated electromagnetic wave and supply a reception signal to the communication processing unit 213 via the terminal unit 214.

The communication processing unit 213 is driven by current flowing through the antenna coil 212 to communicate with the reader/writer 320. Specifically, the communication processing unit 213 demodulates a received modulation signal, decodes demodulated data, and writes the decoded data in an inner memory included in the communication processing unit 213. Also, the communication processing unit. 213 reads, from the inner memory, data to be transmitted to the reader/writer 320, encodes the read data, modulates a carrier wave based on the encoded data, and transmits, to the reader/writer 320, modulated electric wave via the antenna coil 212 magnetically coupled by inductive coupling. Note that the communication processing unit 213 may be driven not by electric power flowing through the antenna coil 212 but by electric power supplied from electric power supply means such as a battery pack incorporated in the electronic apparatus or an external power supply.

The metal plate 203 is provided inside the housing of the electronic apparatus 230, and serves as a first conductor opposing the reader/writer 320 as an external apparatus. The metal plate 203 is provided inside the housing of the electronic apparatus such as, for example, a portable telephone, smartphone, or tablet PC, and configures a first conductor opposing the reader/writer 320 at the time of communication of the antenna module 202. As this first conductor, for example, a metal cover attached to an inner surface of a housing of a smartphone, a metal housing of a battery pack accommodated in a smartphone, a metal plate on a back surface of a liquid-crystal module of a tablet PC, or the like applies.

The magnetic sheet 220 has a function of inducing magnetic fluxes sent from the reader/writer 320 at the time of communication of the antenna module 202 to a center part 212a of the loop antenna 211 in order to enhance a communication characteristic of the antenna module 202. The magnetic sheet 220 is formed of a magnetic material such as iron oxide, chromium oxide, cobalt, or ferrite and, in the present embodiment, as depicted in FIG. 11A and FIG. 11B, has a feature of being provided as developing from the center part 212a of the loop antenna 211 toward an opposing end 203a2 of the outer edge part 203a of the first conductor 203 opposing the loop antenna 211. That is, as depicted in FIG. 11B, the magnetic sheet is provided as developing from one side 203a1 where the loop antenna 211 is provided toward the opposite side 203a2 opposing the one side 203a1 of the outer edge part 203a of the metal plate 203 where the loop antenna 211 is provided, so as to shield the metal plate 203.

In the present embodiment, the magnetic sheet 220 includes a first magnetic sheet 221 inserted into an opening formed in the center part 212a of the loop antenna 211 along the longitudinal direction and a second magnetic sheet 222 developed from the center part 212a of the loop antenna 211 toward the opposing end 203a2. That is, with respect to the first magnetic sheet 221 inserted into the center part 212a of the loop antenna 211, the second magnetic sheet 222 is provided so as to develop from the center part 212a toward the opposing end 203a2 provided at a position of the outer edge part 203a of the metal plate 203 opposing the loop antenna 211. In the present embodiment, for a simple structure of the magnetic sheet 220 for ease of manufacture, the first magnetic sheet 221 and the second magnetic sheet 222 are configured as being integrally molded.

Note that, of the outer edge part 203a of the metal plate 203, the "opposing end" indicates an area or region of the outer edge part 203a provided at a position opposing an area where the loop antenna 211 is provided. That is, in one example depicted in FIG. 11B, of the outer edge part 203a of the metal plate 203 in a substantially rectangular shape, the opposing end indicates the opposite side 203a2 provided at a position opposing the one side 203a1 as an area where the loop antenna 211 is provided.

Also in the present embodiment, as for the second magnetic sheet 222, the second magnetic sheet 222 is provided so as to develop toward the opposing end 203a2 of the outer edge part 203a of the metal plate 203 opposing the loop antenna 211. Specifically, as depicted in FIG. 11B, the second magnetic sheet 222 is provided as developing from the one side 203a1 where the loop antenna 211 is provided toward the opposite side 203a2 opposing the one side 203a of the outer edge part 203a of the metal plate 203 so as to shield the metal plate 203.

Note that, in the present embodiment, the second magnetic sheet 222 shields the metal plate 203 from the center part 212a of the loop antenna 211 to an area in the course from the one side 203a1 to reach the opposite side 203a2 of the outer edge part 203a of the metal plate 203. However, to more reliably collect magnetic fluxes from the reader/writer 320 and send them to the center part 212a of the loop antenna 211, the second magnetic sheet 222 is preferably developed to reach the opposite side 203a2 as an opposing end of the one side 203a1 of the outer edge part 203a.

As described above, in the present embodiment, the metal plate 203 as the first conductor is shielded with the magnetic sheet 220 provided so as to develop from the area 203a1 where the loop antenna 211 is provided toward the opposing end 203a2 of the outer edge part 203a of the metal plate 203. Thus, when the antenna device 201 included in the electronic apparatus 230 performs short-distance non-contact communication with the reader/writer 320, the magnetic fluxes sent from the reader/writer 320 are collected by the second magnetic sheet 222 provided so as to shield the metal plate 203. Then, the magnetic fluxes from the reader/writer 320 collected by the second magnetic sheet 222 are led into the center part 212a of the loop antenna 211 via the first magnetic sheet 221. In this manner, via the second magnetic sheet 222 and the first magnetic sheet 221, with the magnetic fluxes guided to the center part 212a of the loop antenna 211, a large electromotive force occurs in the antenna coil 212, and therefore the communication characteristic by NFC of the antenna device 201 is more improved.

That is, in the present embodiment, the metal plate 203 is shielded with the second magnetic sheet 222 additionally provided to the first magnetic sheet 221 so as to develop from the center part 212a of the loop antenna 211 provided on the one side 203a1 as the outer edge part 203a of the metal plate 203 toward the opposite side 203a2 as an opposing end of the outer edge part 203a when viewed from the reader/writer 320. In other words, the metal plate 203 is shielded by providing the second magnetic sheet 222 on an upstream side of the flow of magnetic fluxes received from the reader/writer 320. Thus, by using concentration of magnetic fluxes by the magnetic shielding effect of the metal plate 203 such as a board incorporated in the electronic apparatus 230 such as a portable terminal, the communication characteristic performance of the outer edge part 203a of the metal plate 203 included in the antenna module 202 where communication characteristic is increased is improved.

In other words, in the present embodiment, the second magnetic sheet 222 provided so as to shield the metal plate 203 can reliably collect magnetic fluxes sent from the reader/writer 320 toward the metal plate 203 and can send the magnetic fluxes to the center part 212a of the loop antenna 211 via the first magnetic sheet 221. Thus, even if the electronic apparatus 230 becomes small in size and multifunctional, the antenna module 202 with a high-performance communication characteristic can be achieved by using the magnetic shielding effect by its main metal plate 203. In particular, when the metal plate 203 as the first conductor is a metal cover which covers the housing 232 of the electronic apparatus 230, by shielding the metal cover with the second magnetic sheet 222, with the use of the magnetic shielding effect by the main metal plate 203 of the electronic apparatus 230 which is becoming small in size and multifunctional, its NFC communication characteristic can be enhanced.

As described above, to enhance the communication characteristic by using concentration of magnetic fluxes by the magnetic shielding effect of the metal plate 203 such as a board, it is required to send the magnetic fluxes from the reader/writer 320 collected by the second magnetic sheet 222 to the center part 212a of the loop antenna 211 via the first magnetic sheet 221. Thus, in the present embodiment, the first magnetic sheet 221 is provided so that its one end (the second magnetic sheet 222 in the present embodiment because the structure is such that the first magnetic sheet 221 and the second magnetic sheet 222 are integrally molded) is disposed on an upper side of the one side part 211a when viewed from the reader/writer 320 and a portion except the one end (a tip-side portion of the first magnetic sheet 221 in the Y direction depicted in FIG. 10B) is disposed on a lower side of the other side part 211b when viewed from the reader/writer 320.

Note that the loop antenna 211 may be coiled so that the number of lines of the antenna coil 212 on the other side part 211b where an antenna metal foil 204 does not overlap (for example, four) is larger than the number of lines of the antenna coil 212 on the one side part 211a where the antenna metal foil 204 overlaps (for example, three). That is, by placing a starting end and a termination end of one conductive wire of the antenna coil on the other side part 211b, coil conductive wires can be formed so as to coil more on the other side part 211b than on the one side part 211a of the loop antenna 211 across the center line 212b of the antenna coil 212. With this, the number of lines of the coil conductively coupled to the magnetic fluxes from the reader/writer 320 can be increased, and a favorable communication characteristic can be achieved.

In the antenna device 201 according to the second embodiment of the present invention described above, the structure is such that the first magnetic sheet 221 and the second magnetic sheet 222 configuring the magnetic sheet 220 are integrally molded. However, the antenna device 201 can have another structure. That is, the antenna device 201 of the present embodiment in the case of modification examples described below can be applied depending on the specification of the electronic apparatus 230 to be mounted.

Figure 12A:
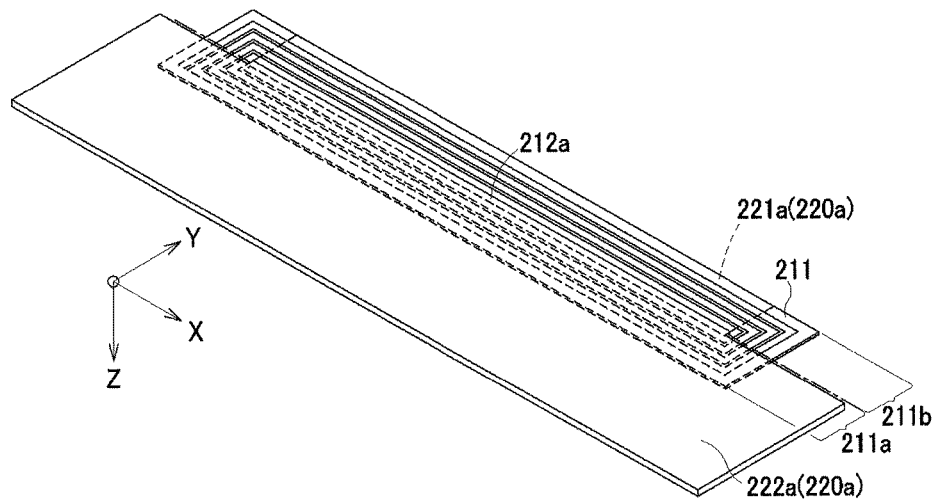
FIG. 12A is a perspective view depicting an arrangement relation between a loop antenna and a magnetic sheet in a modification example of the antenna device according to the second embodiment of the present invention.
Figure 12B:
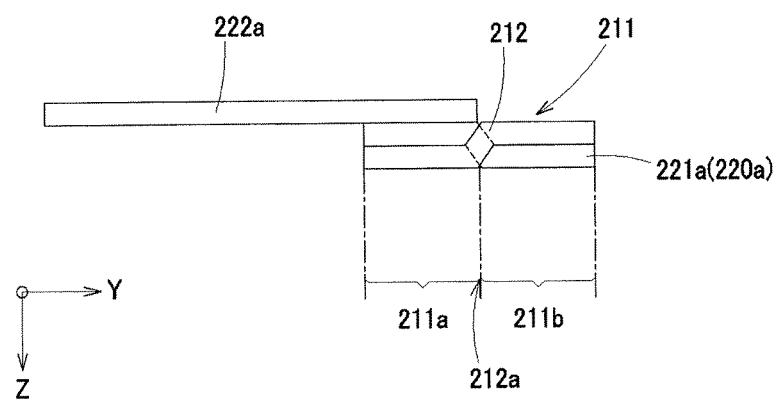
FIG. 12B is a side view depicting the arrangement relation between the loop antenna and the magnetic sheet in the modification example of the antenna device according to the second embodiment of the present invention.

For example, to enhance design flexibility of the magnetic sheets, as depicted in FIG. 12A and FIG. 12B, the structure may be such that a first magnetic sheet 221a and a second magnetic sheet 222a configuring a magnetic sheet 220a are separately molded and then coupled. As described above, with the structure in which the first magnetic sheet 221a and the second magnetic sheet 222a are separately molded and then coupled, the second magnetic sheet 222a with more suitable shape and size can be provided depending on the specification and structure of the electronic apparatus 230.

Figure 13:
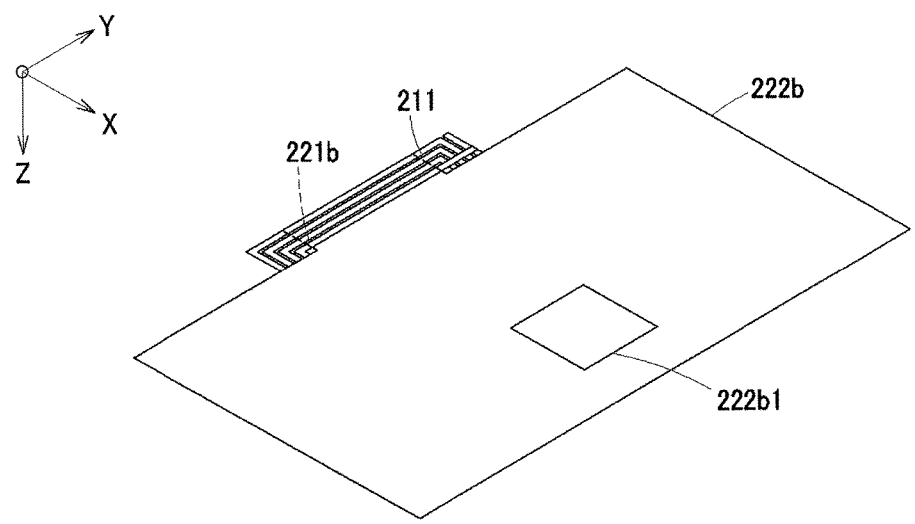
FIG. 13 is a perspective view depicting an arrangement relation between a loop antenna and a magnetic sheet in another modification example of the antenna device according to the second embodiment of the present invention.
Figure 14:
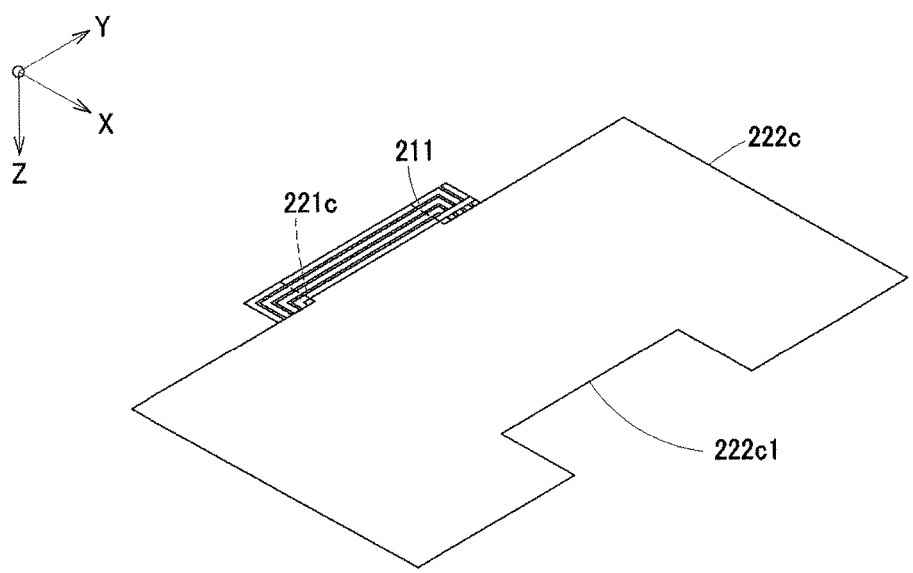
FIG. 14 is a perspective view depicting an arrangement relation between a loop antenna and a magnetic sheet in another modification example of the antenna device according to the second embodiment of the present invention.

Also, to allow application depending on the specification of the electronic apparatus 230 having the antenna device 201 according to the second embodiment of the present invention mounted thereon, a hole part 222b1 as depicted in FIG. 13 or a notch 222c1 as depicted in FIG. 14 for using an electronic component such as a camera or microphone may be formed in a second magnetic sheet 222b. Note that the hole part 222b1 of the second magnetic sheet 222b is formed in an area opposing an opening 203g1 (refer to FIG. 18A and FIG. 18B) provided in the metal plate 203. The hole part 222b1 preferably has an outer diameter smaller than the opening 203g1 in order to reliably collect also magnetic fluxes on the periphery of the opening 203g1 and send them to the center part 212a of the loop antenna 211.

Figure 15:
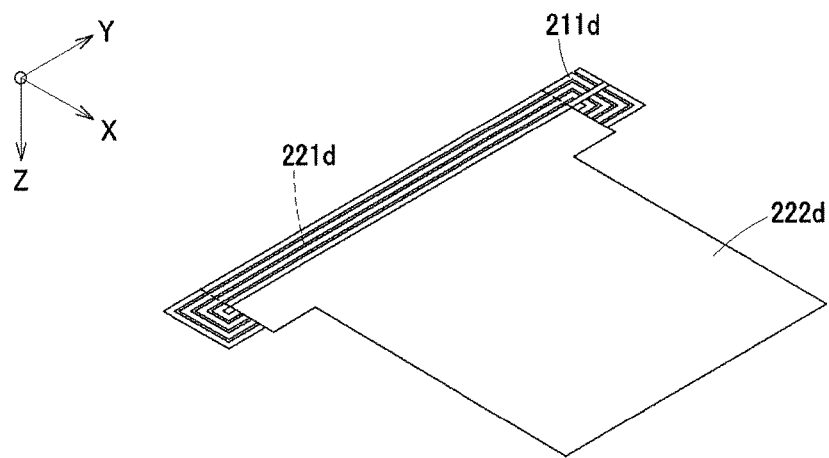
FIG. 15 is a perspective view depicting an arrangement relation between a loop antenna and a magnetic sheet in another modification example of the antenna device according to the second embodiment of the present invention.
Figure 16:
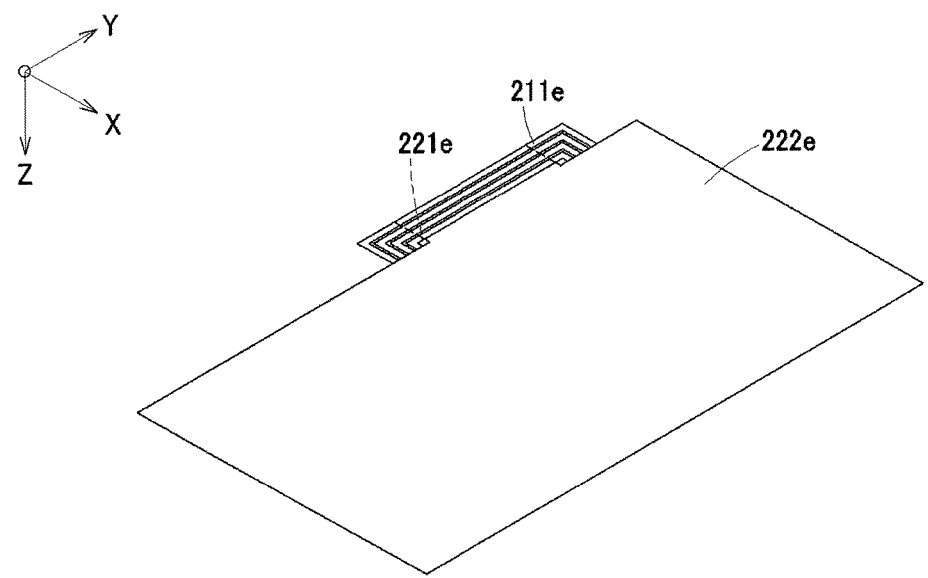
FIG. 16 is a perspective view depicting an arrangement relation between a loop antenna and a magnetic sheet in another modification example of the antenna device according to the second embodiment of the present invention.

Furthermore, the structure may be such that, as depicted in FIG. 15, a second magnetic sheet 222d has a width narrower than the loop antenna 211 and a first magnetic sheet 221d or, as depicted in FIG. 16, the position of a first magnetic sheet 221e with respect to a second magnetic sheet 222e is off-centered.

Figure 17A:
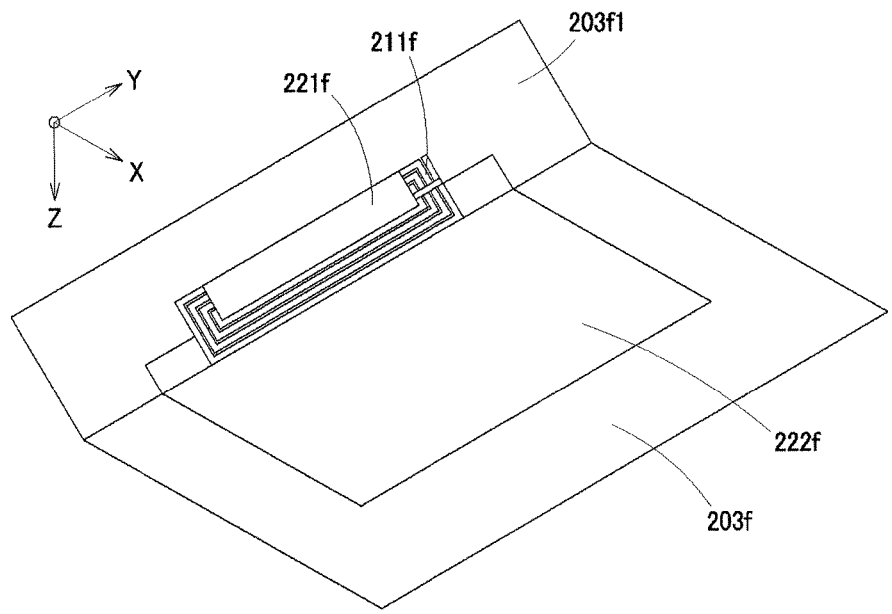
FIG. 17A is a perspective view depicting an arrangement relation between a loop antenna and a magnetic sheet in another modification example of the antenna device according to the second embodiment of the present invention.
Figure 17B:
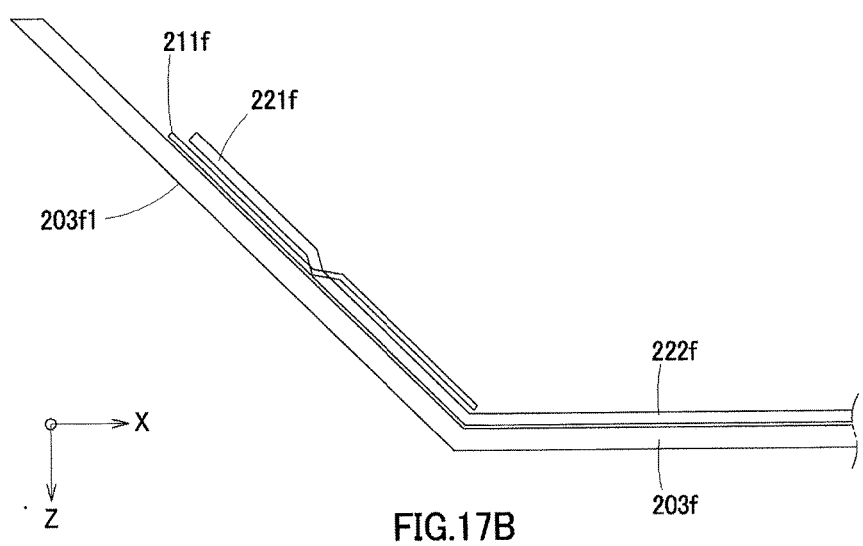
FIG. 17B is a side view depicting the arrangement relation between the loop antenna and the magnetic sheet in the other modification example of the antenna device according to the second embodiment of the present invention.

Also, the implementation area of the antenna device 201 according to the second embodiment of the present invention is not restricted to the flat-shaped metal plate 203. For example, as depicted in FIG. 17A, the antenna device 201 can be implemented on a curved metal cover 203f having an inclined surface 203f1. Here, as depicted in FIG. 17B, a first magnetic sheet 221f and a second magnetic sheet 222f are formed by integral molding, but the first magnetic sheet 221f and the second magnetic sheet 222f may be separately molded and laminated.

Figure 18A:
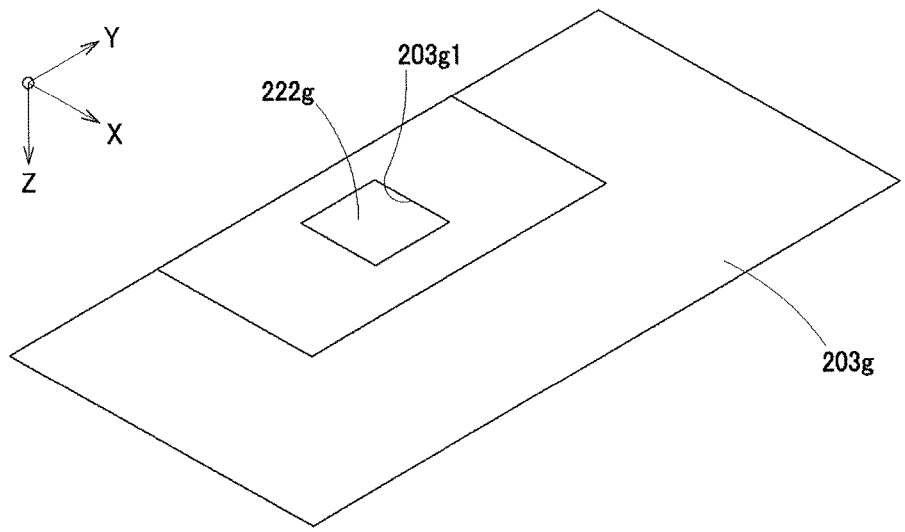
FIG. 18A is a perspective view depicting an arrangement relation between a loop antenna and a magnetic sheet in another modification example of the antenna device according to the second embodiment of the present invention.
Figure 18B:
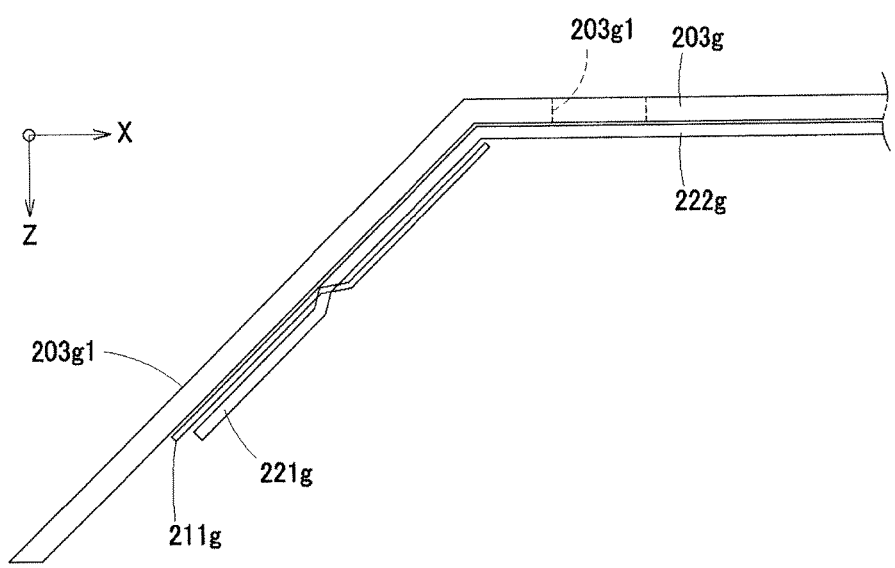
FIG. 18B is a side view depicting the arrangement relation between the loop antenna and the magnetic sheet in the other modification example of the antenna device according to the second embodiment of the present invention.

Furthermore, as depicted in FIG. 18A, the antenna device 201 can be implemented also on a metal cover 203g having the opening 203g1 formed therein. In the present modification example, the first conductor is the curved metal cover 203g having an inclined surface 203g1 and, as depicted in FIG. 18B, a loop antenna 211g is provided on the inclined surface 203g1 of the metal cover 203g. The magnetic fluxes from the reader/writer 320 collected by a second magnetic sheet 222g are sent via the second magnetic sheet 222g and a first magnetic sheet 221g to the loop antenna 211g.

As a result of diligent studies to achieve the above-described objects of the present invention, the inventors have found that, when the opening 203g1 is formed in the metal cover 203g as the first conductor, if the metal cover 203g is shielded with the second magnetic sheet 222g, the NFC communication characteristic using the magnetic shielding effect by the metal plate 203 is significantly improved. Thus, in the present embodiment, the second magnetic sheet 222g is provided so as to shield the metal cover 203g where the opening 203g1 is formed. Note that while the structure is such that the first magnetic sheet 221g and the second magnetic sheet 222g are integrally molded in the modification example depicted in FIG. 18B, the structure may be such that the first magnetic sheet 221g and the second magnetic sheet 222g are separately molded and then laminated.

Third Embodiment

Figure 19:
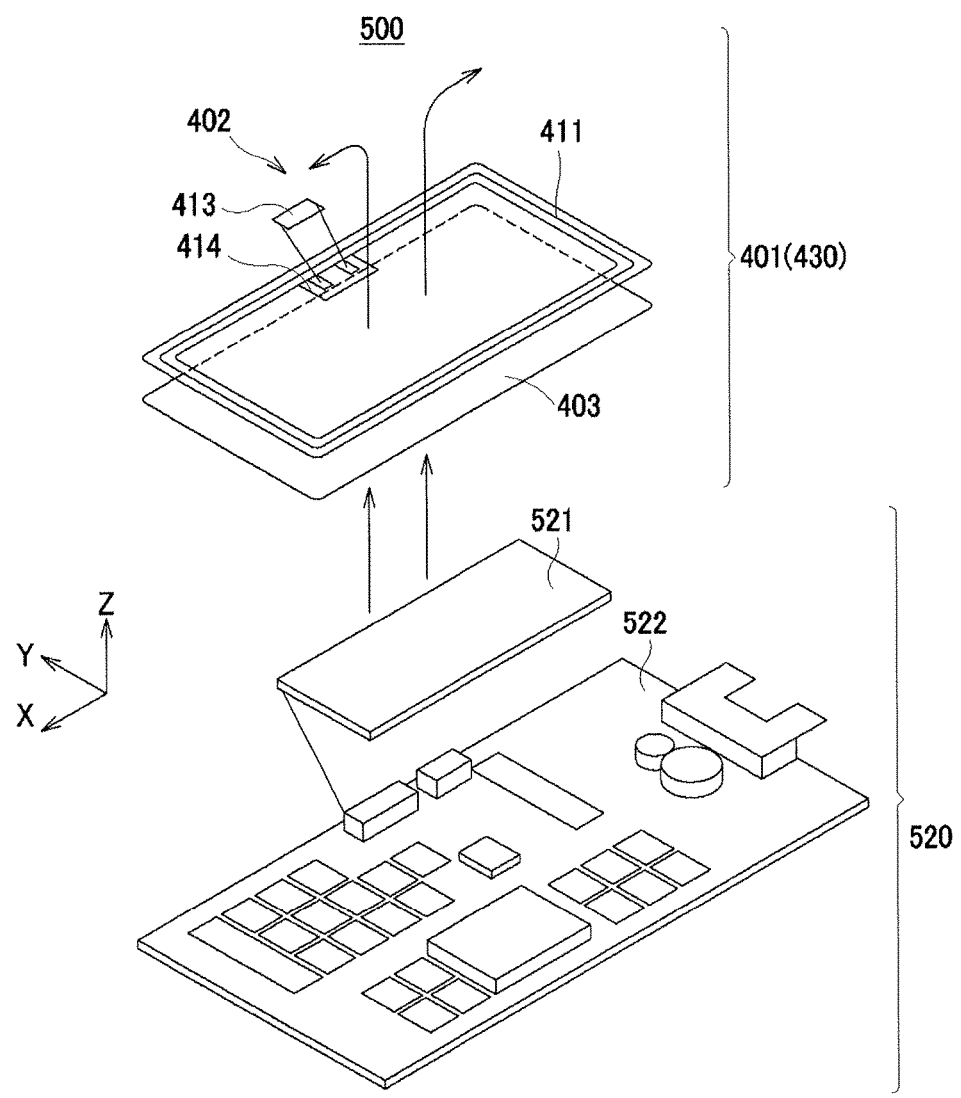
FIG. 19 is a perspective view depicting schematic structure of a wireless communication system to which an antenna device according to a third embodiment of the present invention is applied.
Figure 20A:
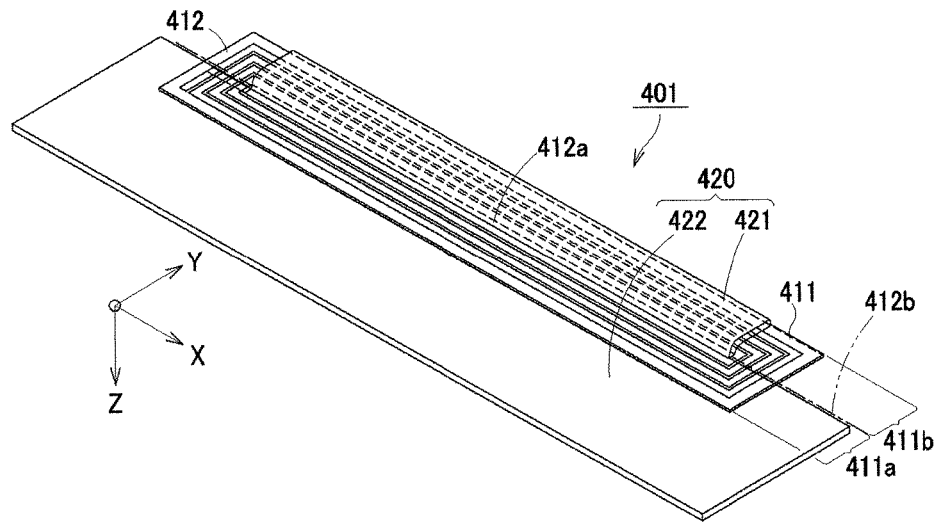
FIG. 20A is a perspective view depicting an arrangement relation between a loop antenna and a magnetic sheet in the antenna device according to the third embodiment of the present invention.
Figure 20B:
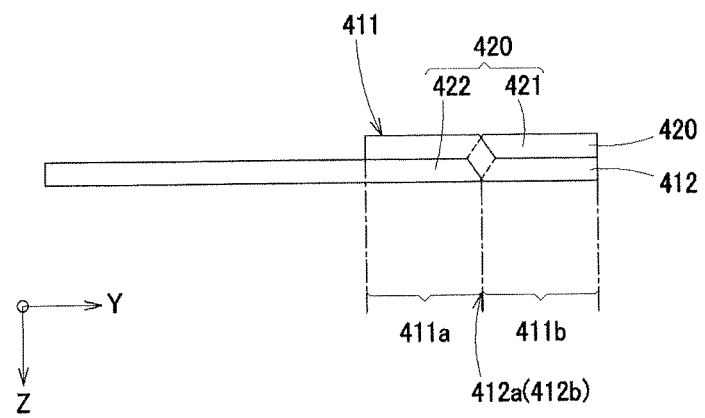
FIG. 20B is a side view depicting the arrangement relation between the loop antenna and the magnetic sheet in the antenna device according to the third embodiment of the present invention.
Figure 21A:
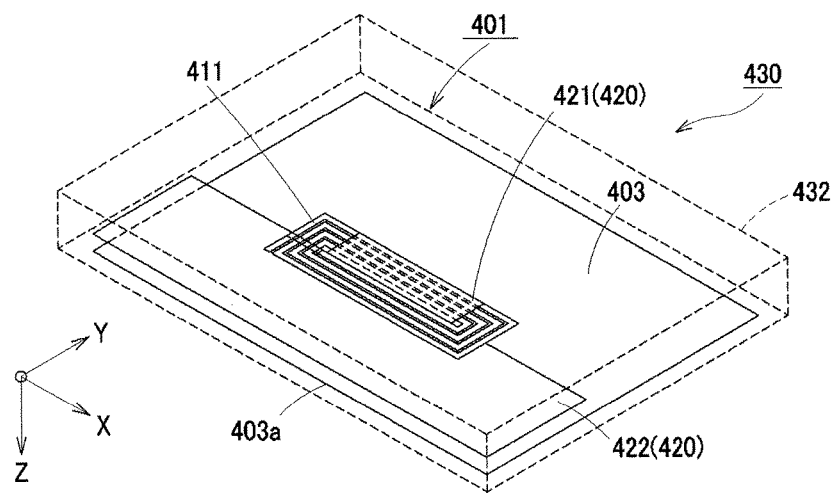
FIG. 21A is a perspective view depicting one example of an electronic apparatus including the antenna device according to the third embodiment of the present invention.
Figure 21B:
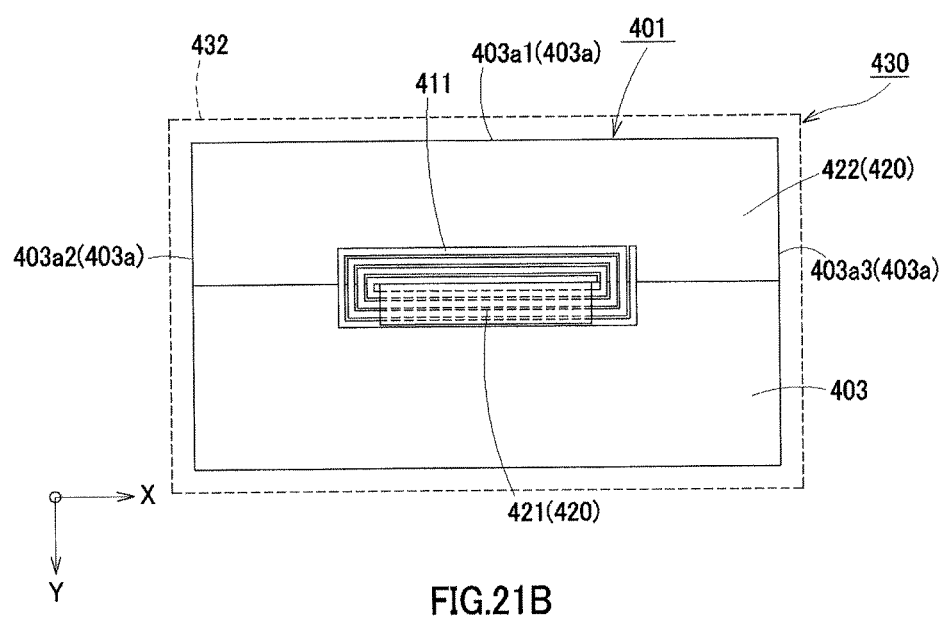
FIG. 21B is a plan view depicting one example of the electronic apparatus including the antenna device according to the third embodiment of the present invention.

Next, the structure of an antenna device according to a third embodiment of the present invention is described by using the drawings. FIG. 19 is a perspective view depicting schematic structure of a wireless communication system to which the antenna device according to the third embodiment of the present invention is applied, FIG. 20A is a perspective view depicting an arrangement relation between a loop antenna and a magnetic sheet in the antenna device according to the third embodiment of the present invention, FIG. 20B is a side view depicting the arrangement relation between the loop antenna and the magnetic sheet in the antenna device according to the third embodiment of the present invention. Also, FIG. 21A is a perspective view depicting one example of an electronic apparatus including the antenna device according to the third embodiment of the present invention, and FIG. 21B is a plan view depicting one example of the electronic apparatus including the antenna device according to the third embodiment of the present invention.

An antenna device 401 according to the present embodiment is a device incorporated in an electronic apparatus 430 to communicate with an external apparatus via an electromagnetic field signal and is used, for example, as being incorporated in a wireless communication system 500 for RFID as depicted in FIG. 19.

The wireless communication system 500 includes, as depicted in FIG. 19, the antenna device 401 included in the electronic apparatus 430 and a reader/writer 520 as an external apparatus which makes an access to the antenna device 401. Here, the antenna device 401 and the reader/writer 520 are assumed to be disposed so as to oppose each other on a xy plane of a three-dimensional orthogonal coordinate system xyz.

The reader/writer 520 functions as a transmitter which transmits a magnetic field in a z-axis direction to the antenna device 401 opposing each other on the xy plane, and specifically includes an antenna 521 which transmits a magnetic field toward the antenna device 401 and a control board 522 which communicates with the antenna device 401 inductively coupled via the antenna 521.

That is, the reader/writer 520 has disposed thereon the control board 522 electrically connected to the antenna 521. On this control board 522, a control circuit formed of electronic components such as one or plurality of integrated circuit chips is implemented. This control circuit performs various processes based on data received from the antenna device 401.

For example, when transmitting data to the antenna device 401, the control circuit encodes the data, modulates a carrier wave at a predetermined frequency (for example, 13.56 MHz) based on the encoded data, amplifies the modulated modulation signal, and drives the antenna 521 with the amplified modulation signal. Also, when reading data from the antenna device 401, the control circuit amplifies a modulation signal of data received at the antenna 521, demodulates the amplified modulation signal of the data, and decodes the demodulated data.

Note that an encoding scheme and a modulation scheme for use in general readers/writers are used in the control circuit and, for example, the Manchester encoding scheme and ASK (Amplitude Shift Keying) modulation scheme are used. Also, while the antenna device and so forth in a non-contact communication system are described below, it is assumed that application can be similarly made also for a non-contact charging system such as Qi (chee).

The antenna device 401 is incorporated inside a housing 432 of the electronic apparatus 430 such as a portable telephone disposed so as to oppose the reader/writer 520 on the xy plane at the time of communication to communicate with the external apparatus via an electromagnetic field signal. The antenna device 401 of the present embodiment includes an antenna module 402, a metal plate 403, and a magnetic sheet 420 (refer to FIG. 20A).

The antenna module 402 is provided inside the housing 432 of the electronic apparatus 430 (refer to FIG. 21A) to communicate with the inductively-coupled reader/writer 520. In the present embodiment, as depicted in FIG. 19, the antenna module 402 includes a loop antenna 411, a communication processing unit 413, and a terminal unit 414.

The loop antenna 411 is provided inside the housing 432 of the electronic apparatus 430, and has an antenna coil 412 (refer to FIG. 20A) coiling thereon, which becomes communicable with the reader/writer 520 by being inductively coupled to the reader/writer 520 as an external apparatus. In the present embodiment, as depicted in FIG. 21A and FIG. 21B, the loop antenna 411 is provided inside and via a predetermined space from an outer edge part 403a of the metal plate 403 when viewed from the reader/writer 520. That is, the loop antenna 411 is not provided near the outer edge part 403a of the metal plate 403. As depicted in FIG. 19, the loop antenna 411 has implemented thereon the antenna coil 412 formed by patterning process or the like on a flexible conductor wire such as, for example, a flexible flat cable, and the terminal unit 414 for electrically connecting the antenna coil 412 and the communication processing unit 413.

The loop antenna 411 has a substantially rectangular shape as depicted in FIG. 20A, and one conductor wire of the antenna coil 412 is coiled along the outer shape, and its center part 412a is an opening. Note that while the loop antenna 411 has a substantially rectangular shape in the present embodiment, the shape may be another shape such as an oval. Also, it is assumed that a "longitudinal direction" of the loop antenna 411 in the specification indicates a direction in which its length or outer diameter indicates a maximum value, indicating a long-side direction in the case of a substantially rectangular shape and a major-axis direction in the case of a substantially oval shape.

The loop antenna 411 is disposed so that, as depicted in FIG. 20A, a main surface where the antenna coil 412 coils opposes the reader/writer 520 on the xy plane at the time of communication. Also, the loop antenna 411 has one side part 411a and other side part 411b, with a center line 412b in the longitudinal direction taken as a boundary. In the one side part 411a, a direction in which currents along the longitudinal direction in the conductor wire of the antenna coil 412 are oriented to flow in the same direction is taken as a coiling direction. In the other side part 411b, a direction in which currents along the longitudinal direction in the conductor wire of the antenna coil 412 are oriented to flow in an opposite direction is taken as a coiling direction. And, the loop antenna 411 is disposed, with one side edge along the longitudinal direction oriented toward a metal plate 403 side, that is, with either one of the one side part 411a and the other side part 411b opposing a metal plate 403 side.

Upon receiving a magnetic field transmitted from the reader/writer 520, the antenna coil 412 is magnetically coupled to the reader/writer 520 by inductive coupling to receive a modulated electromagnetic wave and supply a reception signal to the communication processing unit 413 via the terminal unit 414.

The communication processing unit 413 is driven by current flowing through the antenna coil 412 to communicate with the reader/writer 520. Specifically, the communication processing unit 413 demodulates a received modulation signal, decodes demodulated data, and writes the decoded data in an inner memory included in the communication processing unit 413. Also, the communication processing unit 413 reads, from the inner memory, data to be transmitted to the reader/writer 520, encodes the read data, modulates a carrier wave based on the encoded data, and transmits, to the reader/writer 520, modulated electric wave via the antenna coil 412 magnetically coupled by inductive coupling. Note that the communication processing unit 413 may be driven not by electric power flowing through the antenna coil 412 but by electric power supplied from electric power supply means such as a battery pack incorporated in the electronic apparatus or an external power supply.

The metal plate 403 is provided inside the housing 432 of the electronic apparatus 430, and serves as a first conductor opposing the reader/writer 520 as an external apparatus. The metal plate 403 is provided inside the housing of the electronic apparatus such as, for example, a portable telephone, smartphone, or tablet PC, and configures a first conductor opposing the reader/writer 520 at the time of communication of the antenna module 402. As this first conductor, for example, a metal cover attached to an inner surface of a housing of a smartphone, a metal housing of a battery pack accommodated in a smartphone, a metal plate on a back surface of a liquid-crystal module of a tablet PC, or the like applies.

The magnetic sheet 420 has a function of inducing magnetic fluxes sent from the reader/writer 520 at the time of communication of the antenna module 402 to the center part 412a of the loop antenna 411 in order to enhance a communication characteristic of the antenna module 402. The magnetic sheet 420 is formed of a magnetic material such as iron oxide, chromium oxide, cobalt, or ferrite and, in the present embodiment, as depicted in FIG. 21A and FIG. 21B, has a feature of being provided as being expanded at least from the center part 412a of the loop antenna 411 to a portion of the outer edge part 403a of the first conductor 403.

In the present embodiment, the magnetic sheet 420 includes a first magnetic sheet 421 inserted into an opening formed in the center part 412a of the loop antenna 411 along the longitudinal direction and a second magnetic sheet 422 extending from the center part 412a of the loop antenna 411 to reach a portion of the outer edge part 403a of the metal plate 403. That is, with respect to the first magnetic sheet 421 inserted into the center part 412a of the loop antenna 411, the second magnetic sheet 422 is provided so as to be expanded from the center part 412a toward at least part of the outer edge part 403a of the metal plate 403. In the present embodiment, for a simple structure of the magnetic sheet 420 for ease of manufacture, the first magnetic sheet 421 and the second magnetic sheet 422 are configured as being integrally molded.

Also in the present embodiment, the second magnetic sheet 422 is provided so as to be expanding toward the nearest portion of the outer edge part 403a of the metal plate 403 from the center part 412a of the loop antenna 411. Specifically, as depicted in FIG. 21B, the second magnetic sheet 422 is provided so as to be expanded toward one side 403a1 of the outer edge part 403a of the metal plate 403 nearest from the center part 412a. And, when provided so as to be expanded toward the one side 403a1, the second magnetic sheet is provided so as to extend to reach part of other sides 403a2 and 403a3 adjacent to each other at both ends of the one side 403a1. Note that the "nearest portion" in the specification indicates an area or region of the outer edge part 403a of the metal plate 403 nearest from the center part 412a of the loop antenna 411 and, when the metal plate 403 has a substantially rectangular shape as in the present embodiment, indicates the one side 403a1 nearest from the center part 412a.

As described above, in the present embodiment, the second magnetic sheet 422 is provided so as to be expanded toward the nearest area of the outer edge part 403a of the metal plate 403 from the center part 412a of the loop antenna 411. Thus, when the antenna device 401 included in the electronic apparatus 430 performs short-distance non-contact communication with the reader/writer 520, the magnetic fluxes received by the magnetic sheet 422 from the reader/writer 520 can be reliably led into the center part 412a of the loop antenna 411 via the first magnetic sheet 421. And, via the second magnetic sheet 422 and the first magnetic sheet 421, with the magnetic fluxes guided to the center part 412a of the loop antenna 411, a large electromotive force occurs in the antenna coil 412, and therefore the communication characteristic can be more improved.

That is, even if provided inside and via a predetermined space from the outer edge part 403a of the metal plate 403 when viewed from the reader/writer 520, the structure in which the outer edge part 403a of the metal plate 403 is equivalently disposed to the center part 412a of the loop antenna 411 can be achieved. Thus, even if the antenna module 402 including the loop antenna 411 is not provided near the outer edge part 403a of the metal plate 403, its NFC favorable characteristic can be achieved so that the antenna module 402 is equivalently disposed in the outer edge part 403a of the metal plate 403 when viewed from the reader/writer 520. In other words, irrespectively of the implementation position of the antenna module 402, by using the magnetic shielding effect by the main metal plate 403 of the electronic apparatus 430, its NFC communication characteristic can be enhanced.

As described above, to achieve the structure in which the outer edge part 403a of the metal plate 403 is equivalently disposed to the center part 412a of the loop antenna 411, it is required to send the magnetic fluxes from the reader/writer 520 collected by the second magnetic sheet 422 via the first magnetic sheet 421 to the center part 412a of the loop antenna 411. Thus, in the present embodiment, as depicted in FIG. 20B, the first magnetic sheet 421 is provided so that its one end (the second magnetic sheet 422 in the present embodiment because the structure is such that the first magnetic sheet 421 and the second magnetic sheet 422 are integrally molded) is disposed on a lower side of the one side part 411a when viewed from the reader/writer 520. And, a portion except the one end (a tip-side portion of the first magnetic sheet 421 in the Y direction depicted in FIG. 20B) is provided so as to be disposed on an upper side of the other side part 411b when viewed from the reader/writer 520.

Note that the loop antenna 411 may be coiled so that the number of lines of the antenna coil 412 on the other side part 411b where the antenna metal foil 404 does not overlap (for example, four) is larger than the number of lines of the antenna coil 412 on the one side part 411a where the antenna metal foil 404 overlaps (for example, three). That is, by placing a starting end and a termination end of one conductive wire of the antenna coil on the other side part 411b, coil conductive wires can be formed so as to coil more on the other side part 411b than on the one side part 411a of the loop antenna 411 across the center line 412b of the antenna coil 412. With this, the number of lines of the coil conductively coupled to the magnetic fluxes from the reader/writer 520 can be increased, and a favorable communication characteristic can be achieved.

In the antenna device 401 according to the third embodiment of the present invention described above, the structure is such that the first magnetic sheet 421 and the second magnetic sheet 422 configuring the magnetic sheet 420 provided as being expanded from the loop antenna 411 to the outer edge part 403a of the metal plate 403 are integrally molded. However, the antenna device 401 can have another structure. That is, the antenna device 401 of the present embodiment in the case of modification examples described below can be applied depending on the specification of the electronic apparatus 430 to be mounted.

Figure 22A:
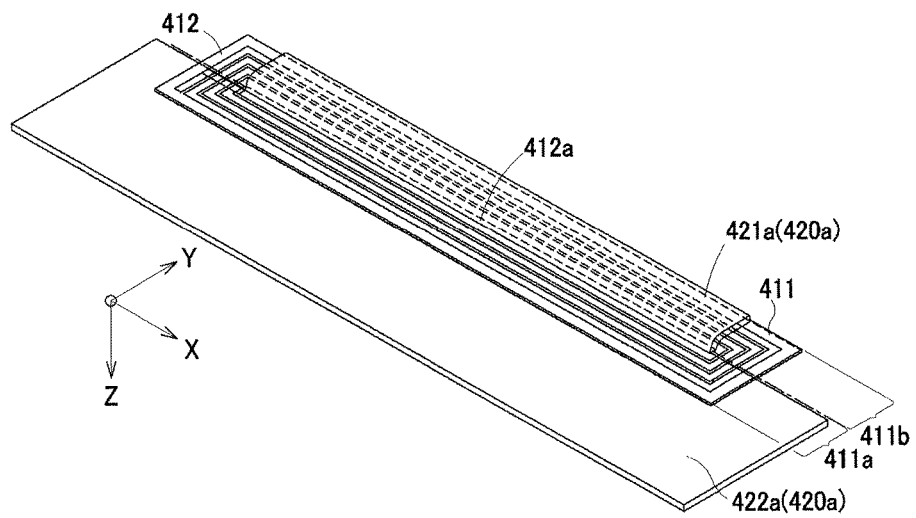
FIG. 22A is a perspective view depicting an arrangement relation between a loop antenna and a magnetic sheet in a modification example of the antenna device according to the third embodiment of the present invention.
Figure 22B:
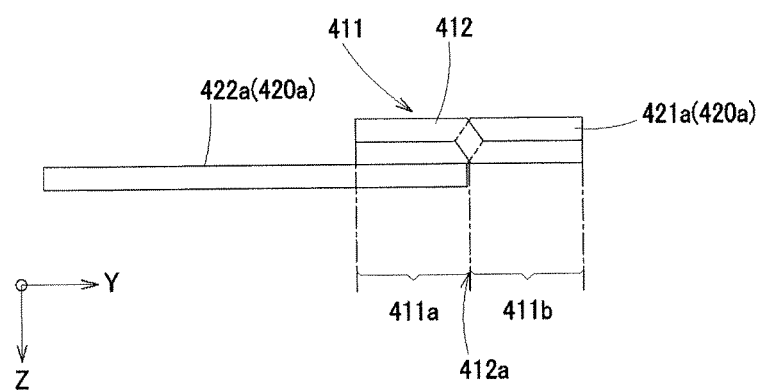
FIG. 22B is a side view depicting the arrangement relation between the loop antenna and the magnetic sheet in the modification example of the antenna device according to the third embodiment of the present invention.

For example, to enhance design flexibility of the magnetic sheets, as depicted in FIG. 22A and FIG. 22B, the structure may be such that a first magnetic sheet 421a and a second magnetic sheet 422a configuring a magnetic sheet 420a are separately molded and then coupled.

Figure 23:
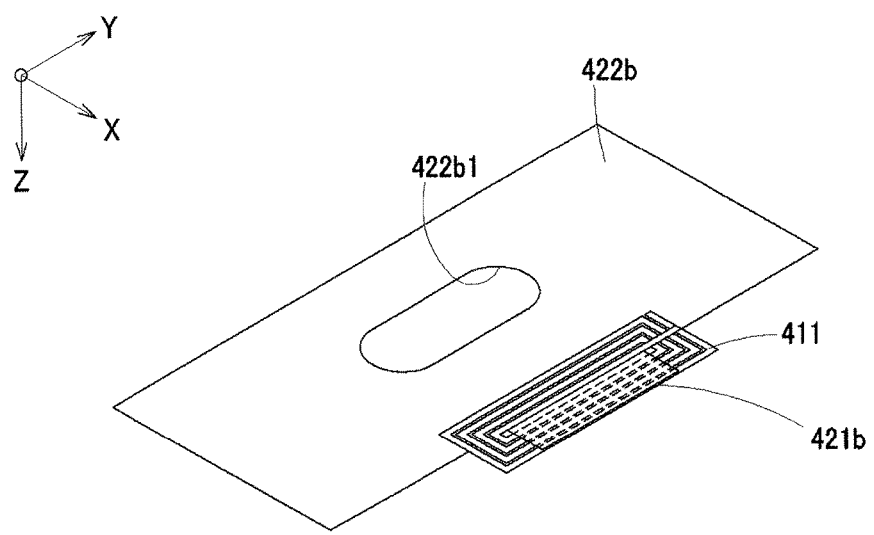
FIG. 23 is a perspective view depicting an arrangement relation between a loop antenna and a magnetic sheet in another modification example of the antenna device according to the third embodiment of the present invention.
Figure 24:
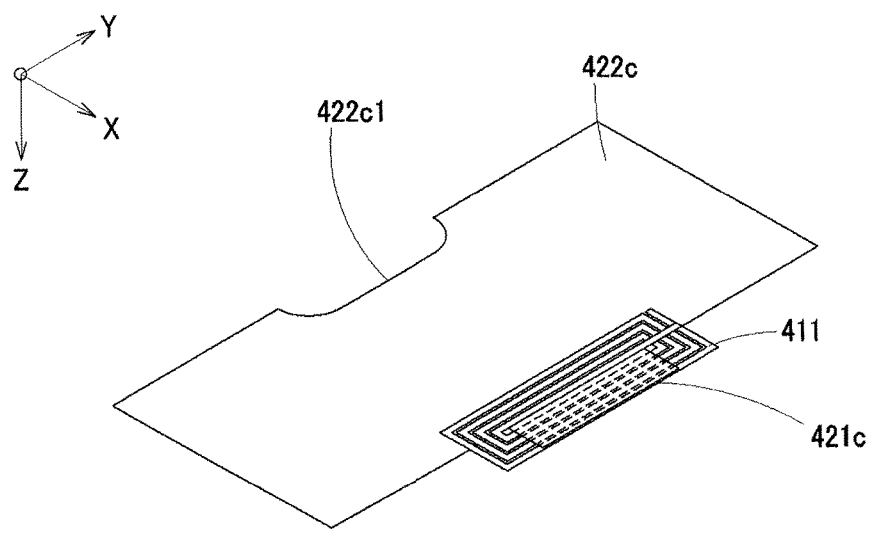
FIG. 24 is a perspective view depicting an arrangement relation between a loop antenna and a magnetic sheet in another modification example of the antenna device according to the third embodiment of the present invention.

Also, to allow application depending on the specification of the electronic apparatus 430 having the antenna device 401 according to the third embodiment of the present invention mounted thereon, a hole part 422b1 as depicted in FIG. 23 or a notch 422c1 as depicted in FIG. 24 for using an electronic component such as a camera or microphone may be formed in a second magnetic sheet 422b.

Figure 25:
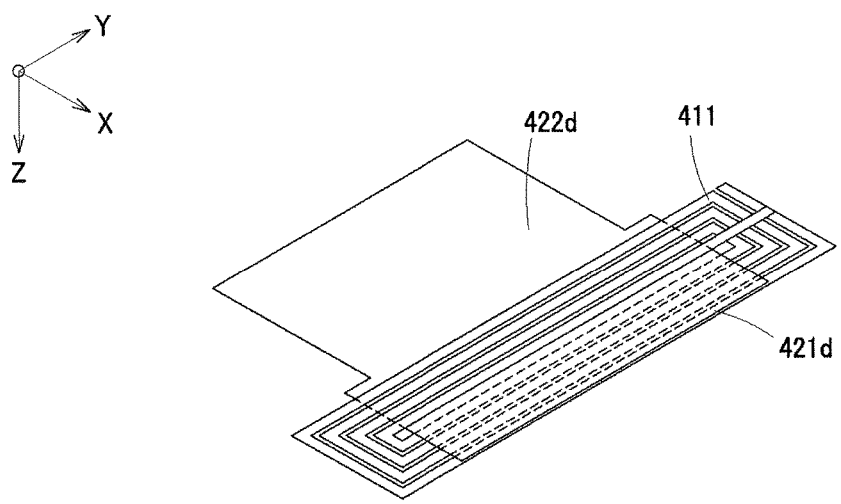
FIG. 25 is a perspective view depicting an arrangement relation between a loop antenna and a magnetic sheet in another modification example of the antenna device according to the third embodiment of the present invention.
Figure 26:
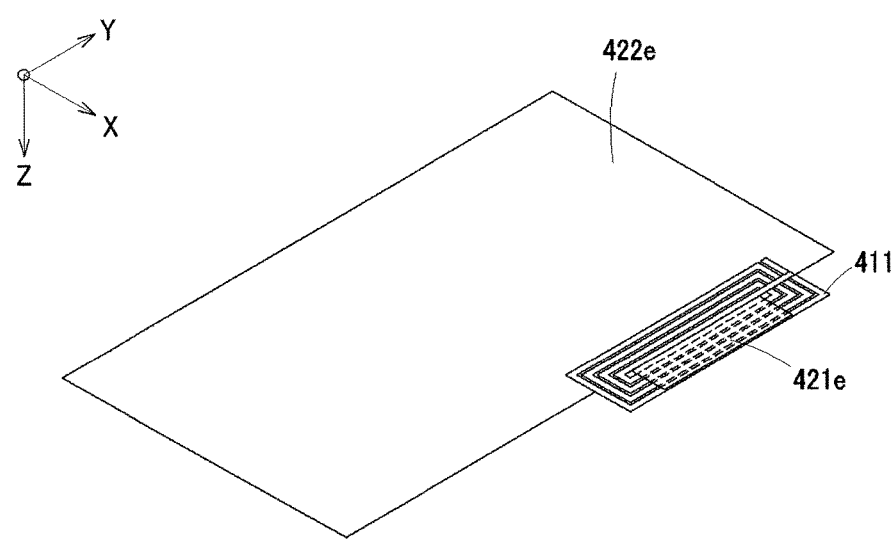
FIG. 26 is a perspective view depicting an arrangement relation between a loop antenna and a magnetic sheet in another modification example of the antenna device according to the third embodiment of the present invention.

Furthermore, the structure may be such that, as depicted in FIG. 25, a second magnetic sheet 422d has a width narrower than the loop antenna 411 and a first magnetic sheet 421d or, as depicted in FIG. 26, the position of a first magnetic sheet 421e with respect to a second magnetic sheet 422e is off-centered.

Figure 27A:
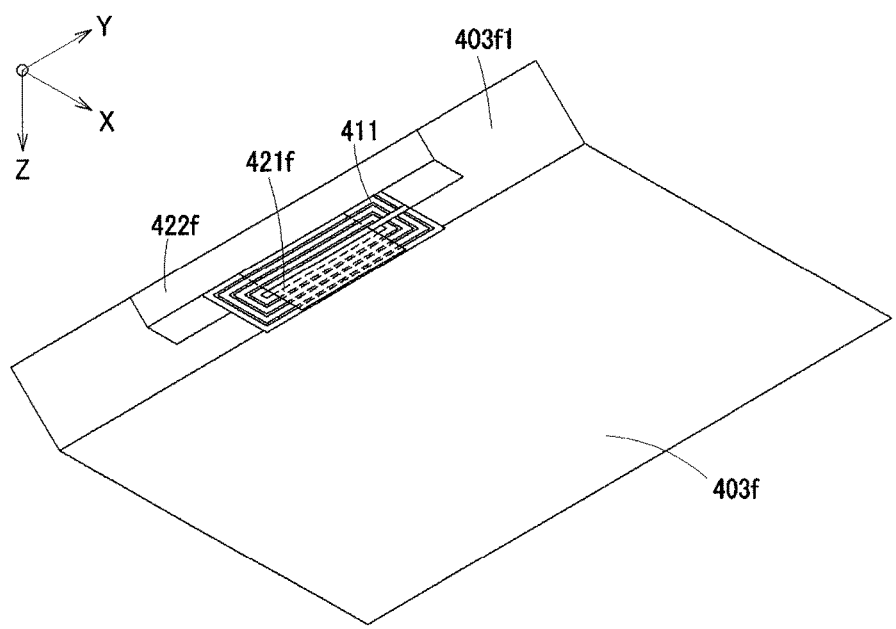
FIG. 27A is a perspective view depicting an arrangement relation between a loop antenna and a magnetic sheet in another modification example of the antenna device according to the third embodiment of the present invention.
Figure 27B:
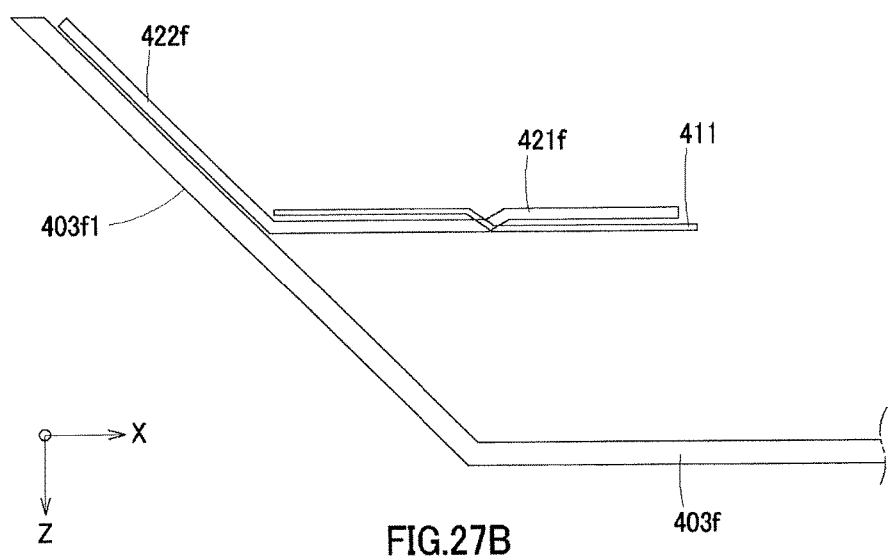
FIG. 27B is a side view depicting the arrangement relation between the loop antenna and the magnetic sheet in the other modification example of the antenna device according to the third embodiment of the present invention.
Figure 28A:
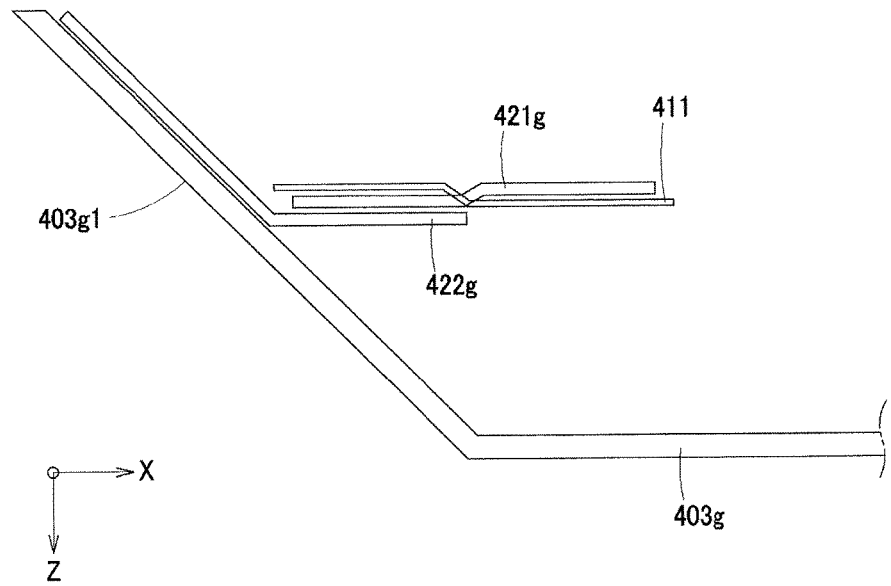
FIG. 28A and FIG. 28B are side views depicting an arrangement relation between a loop antenna and a magnetic sheet in another modification example of the antenna device according to the third embodiment of the present invention.
Figure 28B:
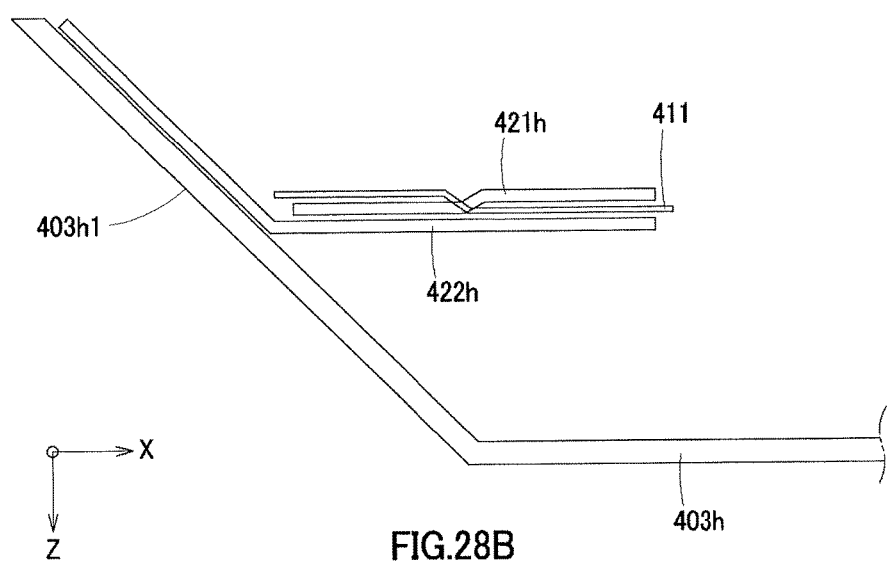

Also, the implementation area of the antenna device 401 according to the third embodiment of the present invention is not restricted to the flat-shaped metal plate 403. For example, as depicted in FIG. 27A, the antenna device 401 can be implemented on a curved metal cover 403f having an inclined surface 403f1. Here, as depicted in FIG. 27B, a first magnetic sheet 421f and a second magnetic sheet 422f may be integrally molded or, as depicted in FIG. 28A, a first magnetic sheet 421g and a second magnetic sheet 422g may be separately molded and laminated. Also, here, as depicted in FIG. 28B, the structure may be such that an overlapping position between a first magnetic sheet 421h and a second magnetic sheet 422h goes over the center portion 412a (refer to FIG. 20A) of the loop antenna 411.

Examples According to Second Embodiment of the Present Invention

Next, a first example of the antenna device according to the second embodiment of the present invention, a first comparative example, which is an example of a conventional antenna device corresponding to the first example, a second example when the metal plate of the antenna device according to the second embodiment of the present invention has an opening, and a second comparative example, which is an example of a convention antenna device corresponding to the second example, are compared and described. Note that the present invention is not restricted to the present examples.

Figure 29:
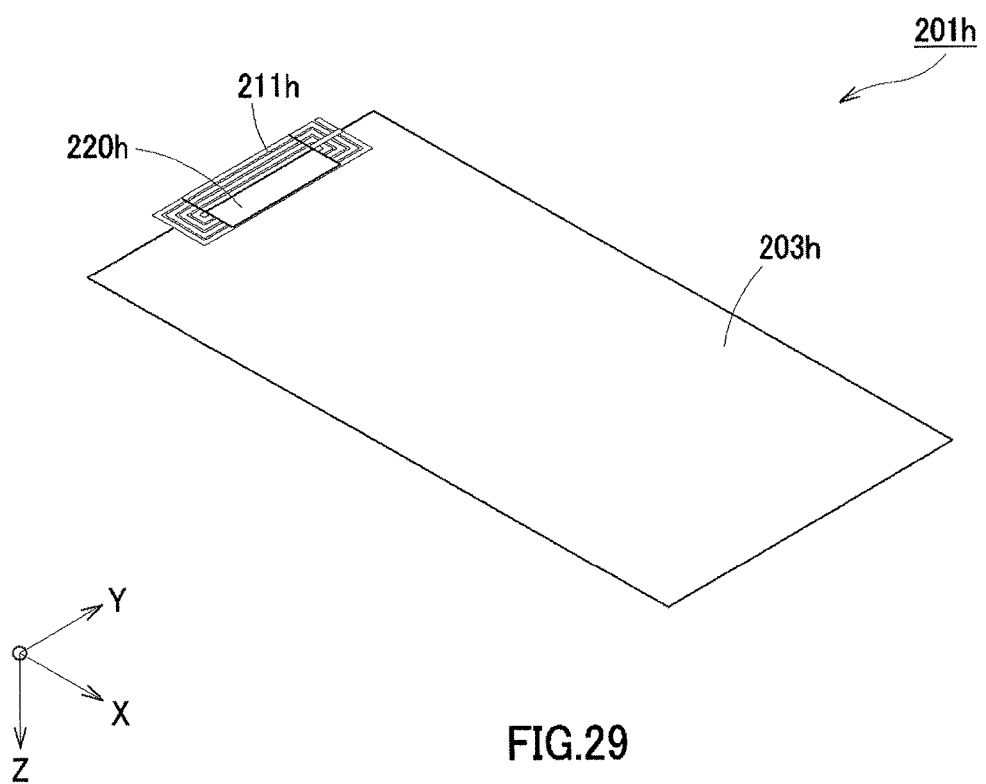
FIG. 29 is a perspective view depicting one example of an antenna device as a comparative example.

Here, for each of the first example of the antenna device 201 (refer to FIG. 11A) according to the second embodiment of the present invention and the comparative example of a conventional antenna device 201h depicted in FIG. 29, coupling coefficients when the opposing reader/writer 320 is moved to a predetermined direction were found by simulation.

That is, in the first example, by using the antenna device 201 according to one embodiment of the present invention depicted in FIG. 11A, with the metal plate 203 and the reader/writer 320 (refer to FIG. 9) opposing each other and a relative positional relation between the metal plate 203 and the loop antenna 211 being changed, communication characteristics were evaluated. In the first comparative example, by using the antenna device 201h including the normal magnetic sheet 220h without addition of the second magnetic sheet as depicted in FIG. 29, with the metal plate 203h and the reader/writer 320 (refer to FIG. 9) opposing each other and a relative positional relation between the metal plate 203h and the loop antenna 211 being changed, communication characteristics were evaluated.

Also, in the second example and the second comparative example, a performance difference when a metal cover with an opening is provided to an upper part of the loop antenna 211 was evaluated. That is, in the second example, as for the case in which the first conductor is a metal cover 203g (refer to FIG. 18A and FIG. 18B) and an opening 203g1 is formed in metal cover 203g, with the metal plate 203g and the reader/writer 320 (refer to FIG. 9) opposing each other and a relative positional relation between the metal plate 203g and the loop antenna 211 being changed, communication characteristics were evaluated. On the other hand, in the second comparative example, by using an antenna device including a normal magnetic sheet without addition of the second magnetic sheet to the antenna device of the second example, with the metal plate and the reader/writer opposing each other and a relative positional relation between the metal plate and the loop antenna being changed, communication characteristics were evaluated.

Specific evaluation conditions are as follows. That is, the antenna 321 of the reader/writer 320 was set as a two-wound coil having an outer diameter defined in a xy-axis direction being 70 mm. Also, the metal plate 203 was set as a stainless steel having diameters defined in xyz axis directions being 50 mm×100 mm×0.3 mm. Also, the antenna coil 212 of the loop antenna 211 is a coil having a structure with an outer shape defined in the xy-axis direction being 30 mm×10 mm. Furthermore, a distance from the surface of the metal plate 203 defined in the z-axis direction to the surface of the antenna coil 212 was set at 4 mm. Also, a distance between the reader/writer 320 and the antenna coil 212 was set at 45 mm.

Also, in the second example and the second comparative example, an opening of 20 mm×20 mm is formed in a metal plate at a position by 10 mm from its tip, the metal plate made of a material having the same dimensions as those of the first example and the first comparative example, and coupling coefficients when an opposing reader/writer is moved to a predetermined direction similarly were found by simulation. Note that the reader/writer was moved to the Y-axis direction depicted in FIG. 11A in the first and second examples and to the X-axis direction depicted in FIG. 29 in the first and second comparative examples.

Figure 30:
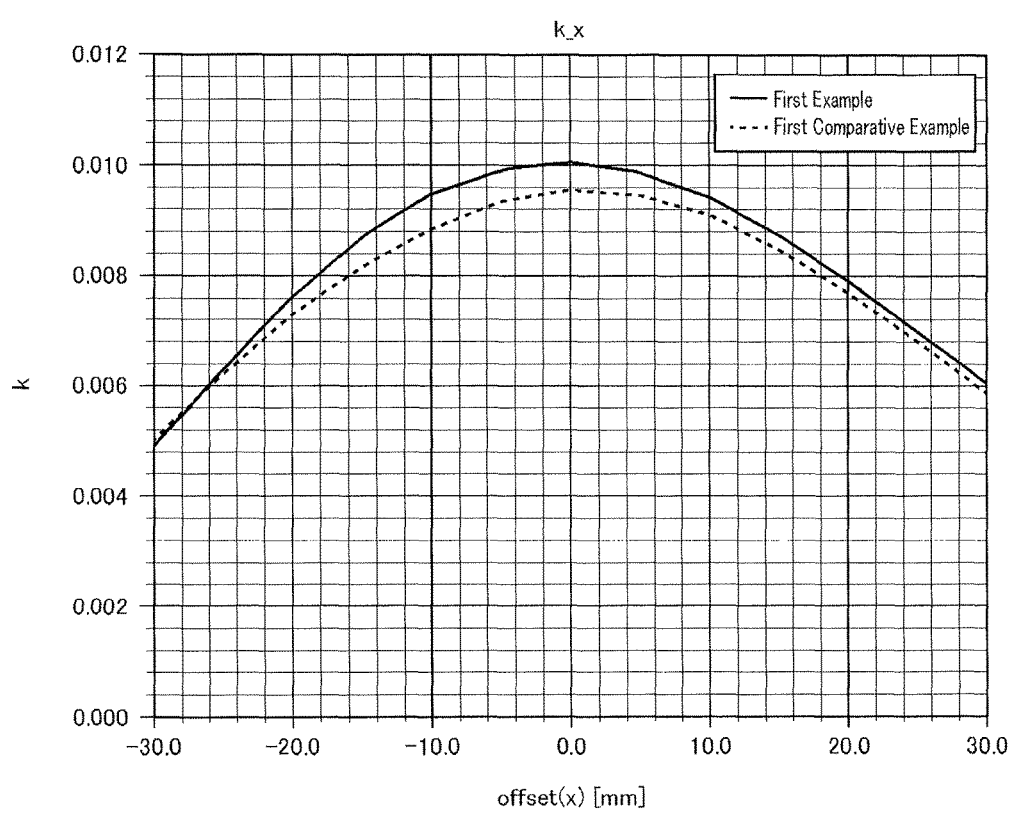
FIG. 30 is a graph depicting changes of coupling coefficients according to a first example and a first comparative example of the antenna device according to the second embodiment of the present invention.
Figure 31:
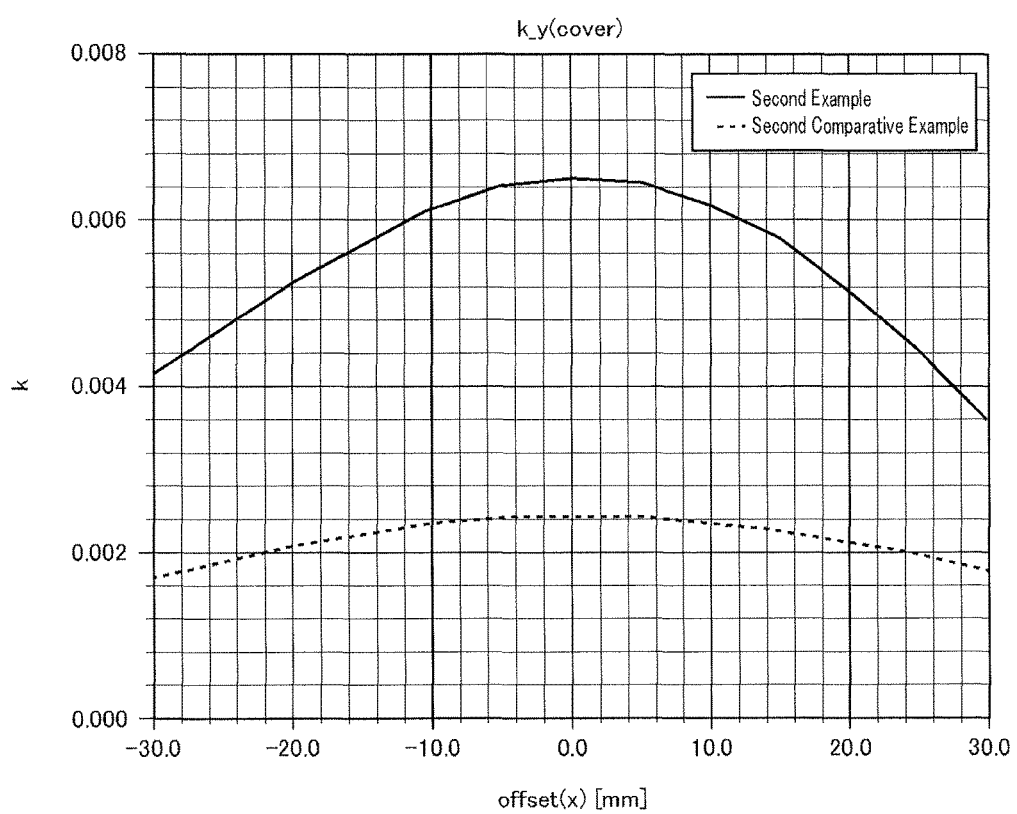
FIG. 31 is a graph depicting changes of coupling coefficients according to a second example and a second comparative example of the antenna device according to the second embodiment of the present invention.

A graph of changes of coupling coefficients according to the first example and the first comparative example is depicted in FIG. 30, and a graph of changes of coupling coefficients according to the second example and the second comparative example is depicted in FIG. 31.

When the changes of the coupling coefficients in the first example and the first comparative example are viewed, as depicted in FIG. 30, compared with the first conventional example, it can be found in the first example that the communication characteristic was slightly improved, approximately 5%. From this, it can be found that, with the magnetic sheet 220 with addition of the second magnetic sheet 222 being provided so as to develop from the center part 212a of the loop antenna 211 toward the opposing end 203a2 of the outer edge part 203a of the metal plate 203, the NFC communication characteristic is slightly improved.

On the other hand, the changes of the coupling coefficients in the second example and the second comparative example are viewed, as depicted in FIG. 31, compared with the second conventional example, it can be found in the second example that the communication characteristic was significantly improved, approximately 2.7 times. From this, it can be found that, with the magnetic sheet with addition of the second magnetic sheet being provided so as to develop from the center part of the loop antenna toward the opposing end of the outer edge part of the metal plate, the NFC communication characteristic is significantly improved.

As a reason for this, it can be thought that magnetic fluxes received from the reader/writer tend to leak from the opening of the metal cover when the antenna device performs short-distance non-contact communication with the reader/writer. That is, since the second magnetic sheet is provided on the upstream side of the flow of the magnetic fluxes from the reader/writer, the magnetic fluxes that are about to leak from the opening of the metal cover are reliably collected by the second magnetic sheet. Then, the magnetic fluxes collected by the second magnetic sheet are guided via the first magnetic sheet to the center part of the loop antenna, and thereby a large electromotive force occurs to the antenna coil to more improve the communication characteristic, which can be thought as a reason.

Example According to Third Embodiment of the Present Invention

Next, an example is described in which the antenna device 401 according to the third embodiment of the present invention and a conventional antenna device without expansion of the magnetic sheet by the second magnetic sheet are compared. Note that the present invention is not restricted to the present example.

Figure 32:
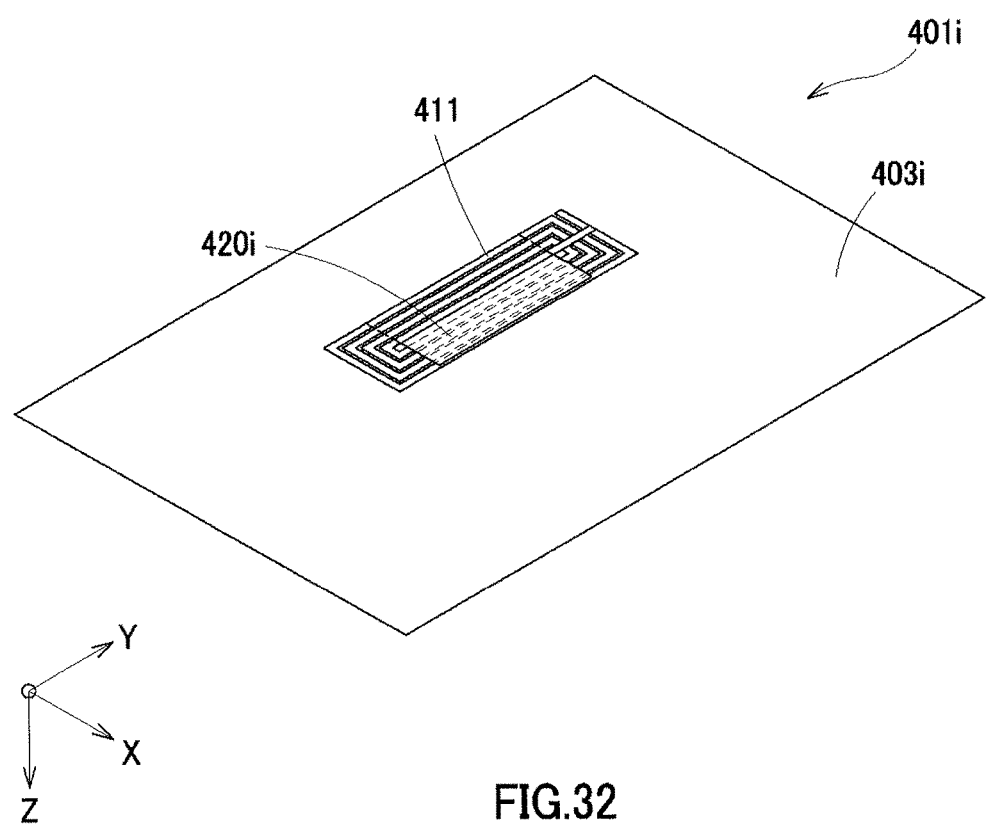
FIG. 32 is a perspective view depicting one example of an antenna device as a comparative example.

Here, for each of an example of the antenna device 401 (refer to FIG. 21A) according to the third embodiment of the present invention and a comparative example of a conventional antenna device 401*i* depicted in FIG. 32, coupling coefficients when the opposing reader/writer 520 is moved to a predetermined direction were found by simulation. That is, in the example, by using the antenna device 401 according to one embodiment of the present invention depicted in FIG. 21A, with the metal plate 403 and the reader/writer 520 (refer to FIG. 19) opposing each other and a relative positional relation between the metal plate 403 and the loop antenna 411 being changed, communication characteristics were evaluated. In the comparative example, by using the antenna device 401*i* including a normal magnetic sheet 420*i* without expansion as depicted in FIG. 32, with the metal plate 403*i* and the reader/writer 520 (refer to FIG. 19) opposing each other and a relative positional relation between the metal plate 403*i* and the loop antenna 411 being changed, communication characteristics were evaluated. Note that the reader/writer 520 was moved to the Y-axis direction depicted in FIG. 21A in the example and to the X-axis direction depicted in FIG. 32 in the comparative example.

Specific evaluation conditions are as follows. That is, the antenna 521 of the reader/writer 520 was set as a four-wound coil having an outer diameter defined in a xy-axis direction being 70 mm. Also, the metal plate 403 was set as a stainless steel having diameters defined in xyz axis directions being 45 mm×35 mm×0.3 mm. Also, the antenna coil 412 of the loop antenna 411 is a four-wound coil having a structure with an outer shape defined in the xy-axis direction being 22 mm×8 mm. Furthermore, a distance from the surface of the metal plate 403 defined in the z-axis direction to the surface of the antenna coil 412 was set at 1 mm. Also, a distance between the reader/writer 520 and the antenna coil 412 was set at 55 mm.

Figure 33:
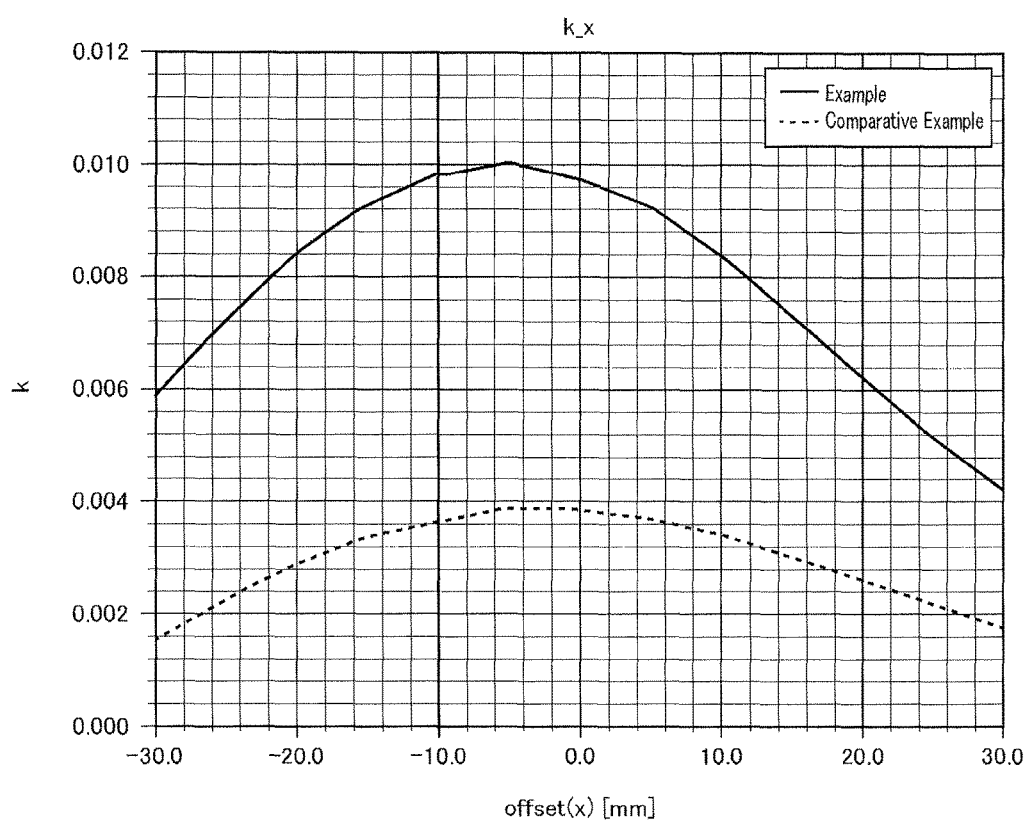
FIG. 33 is a graph depicting changes of coupling coefficients according to an example and a comparative example of the antenna device according to the third embodiment of the present invention.

FIG. 33 is a graph depicting changes of coupling coefficients according to an example and a comparative example of the antenna device according to the third embodiment of the present invention described above. As depicted in FIG. 33, compared with the conventional example, it can be found in the example that the communication characteristics improves approximately 2.5 times. From this, it can be found that the communication characteristic of NFC is improved by adding the second magnetic sheet 422 to the first magnetic sheet 421 inserted into the center part 412*a* of the loop antenna 411 and expanding the magnetic sheet 420 from a center part 412*a* of the loop antenna 411 toward the outer edge part 403*a* of the metal plate 403.

Note that while each of the embodiments and each of the examples of the present invention are described in detail above, it will be easily understood for a person skilled in the art that many modifications substantially not deviating from new matters and effects of the present invention can be made. Therefore, these modification examples are assumed to be all included in the scope of the present invention.

For example, a term described together with a more broader or synonymous different term used in the specification or any of the drawings at least once can be replaced by that different term in any location in the specification or drawings. Also, the configuration and operation of the antenna device and the electronic apparatus are not restricted to those described in one embodiment and each example of the present invention, and various modifications and implementation can be made.

GLOSSARY OF DRAWING REFERENCES

1. Antenna device
2. Antenna module
3. Metal plate (first conductor)
3*a*. End
3*b*. Side surface part
3*c*. One surface
3*d*. Surface opposite to one surface
4. Antenna metal foil (second conductor)
5. Connection metal foil (third conductor)
5*a*. One end
5*b*. Other end
5*c*. Hole part
11. Loop antenna
11*a*. One side part
11*b*. Other side part
12. Antenna coil
12*a*. Center line
13. Communication processing unit
14. Terminal unit
120. Reader/writer (external apparatus)
121. Antenna
122. Control board
133. Smartphone (electronic apparatus)
134. Battery pack
135. Metal housing (first conductor)
141. Outer housing
141*a*. Inner circumferential wall
142. Space
201. Antenna device
202. Antenna module
203. Metal plate (first conductor)
203*a*. Outer edge part
203*a*2. Opposing end
203*g*. Metal cover
203*g*1. Opening
211. Loop antenna
211*a*. One side part
211*b*. Other side part
212. Antenna coil
212*a*. Center part
212*b*. Center line
213. Communication processing unit
214. Terminal unit
220. Magnetic sheet
221. First magnetic sheet
222. Second magnetic sheet
222*b*1. Hole part
222*c*1. Notch
230. Electronic apparatus
232. Housing
320. Reader/writer (external apparatus)
321. Antenna
322. Control board
401. Antenna device
402. Antenna module
403. Metal plate (first conductor)
403*a*. Outer edge part 403a1. One side (nearest portion)
411. Loop antenna
411a. One side part
411b. Other side part
412. Antenna coil
412a. Center part
412b. Center line
413. Communication processing unit
414. Terminal unit
420. Magnetic sheet
421. First magnetic sheet
422. Second magnetic sheet
430. Electronic apparatus
432. Housing
520. Reader/writer (external apparatus)
521. Antenna
522. Control board

The invention claimed is:

1. An antenna device incorporated in an electronic apparatus to communicate with an external apparatus via an electromagnetic field signal, the device comprising:
   a first conductor provided inside a housing of the electronic apparatus and opposing the external apparatus;
   a loop antenna provided inside the housing of the electronic apparatus and having an antenna coil conductively coupled to the external apparatus and coiling thereon;
   a sheet-like second conductor provided as being spaced with a predetermined space from the first conductor and partially overlapping or making contact with a surface of the loop antenna opposite to a surface opposing the external apparatus; and
   a sheet-like third conductor provided between the first conductor and the second conductor and having one end overlapping or making contact with the first conductor and other end partially overlapping or making contact with the second conductor, wherein:
   the first conductor and the second conductor are separated from each other so as not to overlap with each other in a plan view viewed from the external apparatus.

2. The antenna device according to claim 1, wherein
   the loop antenna is divided into two as one side part and other side part via a center line in a longitudinal direction, and
   the second conductor overlaps the one side part where a lead wire of the antenna coil of the loop antenna coils in one direction, and does not overlap the other side part where the lead wire of the antenna coil coils in another direction.

3. The antenna device according to claim 2, wherein
   the second conductor overlaps over a full length of the one side part of the loop antenna.

4. The antenna device according to claim 2, wherein
   the other side part of the loop antenna is disposed via the second conductor at a position opposing the third conductor.

5. The antenna device according to claim 3, wherein
   the second conductor has a size in the longitudinal direction substantially equal to a size of the loop antenna in the longitudinal direction.

6. The antenna device according to claim 3, wherein
   the other side part of the loop antenna is disposed via the second conductor at a position opposing the third conductor.

7. The antenna device according to claim 5, wherein
   the other side part of the loop antenna is disposed via the second conductor at a position opposing the third conductor.

8. The antenna device according to claim 1, wherein
   the third conductor is plurally divided.

9. The antenna device according to claim 8, wherein
   the sheet-like third conductor is configured so as to overlap or make contact with a side surface part of the first conductor.

10. The antenna device according to claim 8, wherein
    the sheet-like third conductor is configured so as to overlap or make contact with one surface of the first conductor opposing the external apparatus or part of a surface opposite to the one surface.

11. The antenna device according to claim 1, wherein
    the third conductor has a hole part formed therein.

12. The antenna device according to claim 11, wherein
    the sheet-like third conductor is configured so as to overlap or make contact with a side surface part of the first conductor.

13. The antenna device according to claim 11, wherein
    the sheet-like third conductor is configured so as to overlap or make contact with one surface of the first conductor opposing the external apparatus or part of a surface opposite to the one surface.

14. The antenna device according to claim 1, wherein
    the third conductor is configured so as to overlap or make contact with a side surface part of the first conductor.

15. The antenna device according to claim 1, wherein
    the sheet-like third conductor is configured so as to overlap or make contact with one surface of the first conductor opposing the external apparatus or part of a surface opposite to the one surface.

16. An electronic apparatus having the antenna device according to claim 1 incorporated therein, the electronic apparatus being communicable with an external apparatus via an electromagnetic field signal.

* * * * *